United States Patent [19]
Norin et al.

[11] Patent Number: 5,787,247
[45] Date of Patent: Jul. 28, 1998

[54] REPLICA ADMINISTRATION WITHOUT DATA LOSS IN A STORE AND FORWARD REPLICATION ENTERPRISE

[75] Inventors: Scott Norin, Newcastle; Darren A. Shakib; Max L. Benson, both of Redmond, all of Wash.

[73] Assignee: Microsoft Corporation, Redmond, Wash.

[21] Appl. No.: 679,054

[22] Filed: Jul. 12, 1996

[51] Int. Cl.⁶ .............................. G06F 15/16; H04L 12/00
[52] U.S. Cl. ..................... 395/200.5; 395/200.46; 395/200.47; 395/200.48; 395/200.49; 395/200.66; 395/200.67; 395/182.04; 395/182.05; 707/201; 707/202; 707/203; 364/285; 364/285.4
[58] Field of Search ................ 395/200.01, 200.03, 395/200.08, 200.09, 617–619, 220.31, 200.42, 200.46, 200.47, 200.48, 200.49, 200.51, 200.52, 200.66, 200.67, 200.64, 200.72, 200.76, 180, 182.04, 182.05; 707/8–10, 201–203; 364/222.2, 285, 285.4

[56] References Cited

U.S. PATENT DOCUMENTS

| | | | |
|---|---|---|---|
| 4,432,057 | 2/1984 | Daniell et al. | 707/8 |
| 4,620,276 | 10/1986 | Daniell et al. | 345/200.31 |
| 4,714,996 | 12/1987 | Gladney et al. | 707/203 |
| 5,261,094 | 11/1993 | Everson et al. | 707/201 |
| 5,440,727 | 8/1995 | Bhide et al. | 395/182.06 |
| 5,491,822 | 2/1996 | Allen et al. | 395/683 |
| 5,555,404 | 9/1996 | Torbjornsen et al. | 707/202 |
| 5,630,116 | 5/1997 | Takaya et al. | 707/201 |
| 5,630,184 | 5/1997 | Roper et al. | 395/200.51 |

OTHER PUBLICATIONS

Yavin, d. "Replication's Fast Track," *BYTE*, Aug. 1995, pp. 88a–88d, 90.

*Primary Examiner*—Parshotam S. Lall
*Assistant Examiner*—Bharat Barot
*Attorney, Agent, or Firm*—Workman, Nydegger & Seeley

[57] ABSTRACT

A system and method for replica administration without data loss is disclosed. In a replication environment where data is replicated around a network and where any system can make changes to the data, data loss may occur if one copy of the data is deleted before changes made to that copy are replicated to other systems in the network. The present invention describes a robust administration environment which prevents inadvertent data loss by verifying that changes made to a local copy of the data reside on at least one other system in the network. The system and method of the present invention also provide a mechanism to allow an administrator to bypass such safeguards in appropriate circumstances in order to handle special cases such as total removal of the data from the network. The replica administration environment is implemented by defining various states that represent the level of participation in the replication of the data. For example, an active state can indicate full participation while a deleted state can indicate no participation. In addition to an active state and a deleted state, one or more intermediate states may be defined. The checks and safeguards can be performed in these intermediate states. In appropriate circumstances, an administrator may force the transition from certain of the intermediate states to either the active state in order to return a system to full participation or to the deleted state in order to bypass the safeguards of the present invention.

27 Claims, 6 Drawing Sheets

REPLICA ADMINISTRATION WITHOUT DATA LOSS IN A STORE AND FORWARD REPLICATION ENTERPRISE

BACKGROUND OF THE INVENTION

1. The Field of the Invention

The present invention relates to systems and methods for replication of data, that is, transferring changes (e.g. creation of new data, modification of existing data or deletion of existing data) made locally at one server to a specified list of other remote or locally connected servers. More specifically, the present invention relates to systems and methods for adding a copy of a data set to a server, moving a copy of a data set from one server to another and/or deleting a copy of a data set from a server without inadvertent data loss.

2. The Prior State of the Art

Today, business and technology trends are changing the way we use computers and information. The personal computer or PC has become the standard business information tool as prices have decreased and computing power has increased. In record numbers, businesses are re-engineering their organizational structure and processes to become faster is and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world—whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as for example word processing documents, spreadsheets, electronic forms, E-mail messages, graphics images or a host of other such data objects. With such shared use of data objects among multiple users of a computer network, there arises the need for each user to keep all other users of the same data object or the same set of data objects apprised of changes that are made locally by that user. This need gives rise to a process called replication of data, that is, transferring changes (e.g., creation of new data, modification of existing data or deletion of existing data) made locally at one server to a specified list of other remote or locally connected servers.

When data is replicated among several servers in a computer network, it is often undesirable to have each and every server contain a copy of each and every data set. If each server contained each and every data set, the message traffic needed to support replication of the data would eventually overwhelm the ability of the computer network to transfer such data. Thus, a network administrator typically selects certain servers on the network to have copies of certain data sets.

In deciding which servers should have copies of which data sets, an administrator typically considers such factors as load balancing, network topology, disk space, network bandwidth, replication latency, and frequency of access. An administrator will typically try to locate copies of the data sets in such a manner that the load on the network is balanced, and which will take advantage of plentiful network resources and minimize dependence on scarce network resources. Furthermore, factors such as replication latency, which represents the time needed for a change made to one copy of a data set to ripple through the network, should also be considered.

In deciding where to locate copies of data sets in a computer network, from time-to-time it typically becomes necessary to change the locations where copies of the data set reside. This can include, for example, adding a copy of a data set on a system which does not currently possess a copy of the data set, moving a copy of the data set from one system to another system, and/or removing a copy of the data set from a system. Whenever one of these actions are undertaken, care must be taken to avoid any inadvertent data loss.

Because of replication latency, when a change is made to a copy of a data set on one server, it will take a finite period of time before those changes propagate, via the replication process, to other servers also having a copy of the data set. Thus, once a change is made, if the copy of the data set is deleted before those changes can be successfully replicated across the computer network, those changes would be lost. Thus, it is important, especially when removing a copy of a data set, to avoid losing any changes which have been made to the local copy of the data set before the changes can be replicated to other servers in the network.

One method of preventing inadvertent data loss would be to delay removing a data set until sufficient time has past for all changes to be replicated across the computer network. For replication enterprises which have a fixed replication latency, such an approach may be feasible. However, most, if not all, replication methods in current use today have no fixed replication latency time. Replication latency is typically a complex function of many variables such as the number of servers with a copy of the data set, the present communication load on the network, the number of changes being made to each local copy of the data set, the network topology, the processing load on each individual server, and the number of data sets being replicated throughout the network. With replication latency depending on so many variables, it is virtually impossible to guarantee that replication latency will remain constant over time.

What is needed, therefore, are systems and methods for replica administration that preclude data loss. It would also be desirable that such systems and methods would be scalable to any number of servers in a network. The systems and methods should also work reliably to prevent data loss independent of a variety of factors such as the number of servers that have copies of the data set, the total number of data sets replicated across the network, the communication bandwidth available, and the frequency with which data sets are changed. Finally, it is preferred that the systems and methods prevent data loss without generating unneeded or unnecessary communication traffic on the network in order to efficiently utilize available communication bandwidth.

SUMMARY AND OBJECTS OF THE INVENTION

1. Glossary of Terms

In order to assist in more easily understanding the terminology used in the following detailed description and summary of the invention, the following definitions for key terms are provided:

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data (called a replica) held locally is the same as replicas held by other replica nodes.

Change number: A unique identifying code used to identify a particular change made to a particular copy of a data object or data set properties by a particular replica node.

Change range: A range of changes, identified by a minimum and maximum change number. The change range is inclusive of the minimum and maximum change number.

Change set: The set of change ranges that defines the changes available for a given replica of a data set on a given replica node. The change set contains changes made on the local replica node and changes to the data set received from other replica nodes through the replication process.

Data set: A set of one or more objects which can be replicated. In one sense a data set can be though of as a container with various data set properties which holds or stores data objects. A populated data set includes both the data objects and data set properties, while an unpopulated data set does not have any associated data objects and refers to the data set properties.

Data set list: A list of the data set properties for the data sets being replicated across the enterprise. In one sense a data set list can be thought of as a container which holds or stores data sets (as defined by their data set properties) in much the same way that a data set is a container that stores data objects. Thus, a data set is a container that holds data objects while a data set list is a container that holds data sets (the set of data sets).

Data set properties: A set of information used to describe or track key information about a data set including a name and/or ID value and the replica list for the data set. The data set properties can also contain other information such as a change number, and a time stamp indicating the time last modified.

Enterprise: The set of servers (or replica nodes) comprising the replication environment.

Replica: A local copy of a particular data set (one or more data objects) replicated on one or more replica nodes throughout the network.

Replica list: A list of all replica nodes on the network containing a replica of a data set. Each entry in the replica list also contains the replica state for each replica node and a time stamp indicating when the entry was last modified.

Replica node: A server or other location on the network where a copy of a data set (called a replica) resides.

Replica state: A state identifier used to indicate the current state of a replica node with respect to a particular data set. Such states can include "active" where the replica node is actively participating in the replication of the data set, "deleted" which indicates the replica node has deleted its copy of the data set, and one or more intermediate states indicating that the replica node is in the process of deleting its copy of the data set.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

2. Brief Summary

The foregoing problems in the prior state of the art have been successfully overcome by the present invention, which is directed to a system and method for replica administration without data loss. The current system and method can be used with virtually any replication process. The preferred replication process, however, is an asynchronous store and forward replication process.

In a store and forward replication process, each server keeps track of locally made changes to a particular copy of a data set (sometimes referred to as a "replica") which contains one or more data objects. Each server periodically broadcasts the new locally made changes (since the last replication broadcast) to all other servers with a copy of the data set. The group of other servers also having a copy of the data set is kept on a "replica list." The changes are preferably broadcast in the form of updated copies of the changed data objects. This allows each server to update its local copy of the data set as changes are received by replacing the older data objects with the newer data objects. In essence, a store and forward replication process utilizes existing networking hardware as a transport system to deliver one way, unacknowledged messages between servers, much like E-mail messages are delivered between users of computer systems.

In addition to replicating data set objects, store and forward replication also replicates "data set properties." Data set properties describe and define a data set. Data set properties can include such information as a data set name and/or other identifying information, access privilege information such as a list of users which can access or change the contents and/or properties of the data set, a replica list which contains those replica nodes with a copy of the contents of the data set, and other information. Data set properties can be replicated independently from the data objects of the data set. By replicating data set properties to all or some of the replica nodes in the enterprise, those replica nodes will know what data sets are available throughout the enterprise and where copies of the data sets can be found.

In accordance with the present invention, each server has several states which indicate its participation in the replication process for a particular data set. These states are referred to as "replica states." For example, an "active" state can indicate that a server is actively participating in the replication of a data set. A "deleted" state can be used to indicate that a server has deleted its copy of the data set. In addition, each server can have one or more intermediate states to indicate that it is in the process of removing its local copy of the data set.

Each data set has a replica list property, containing the list of replica nodes, their replica state and a time last modified stamp indicating the time that the replica state was last modified. In this way, when the replication process replicates data set properties throughout the network, then servers will know the replica state of the other servers in the network for each data set.

In order to prevent data loss, a server that is going to remove its copy of a data set performs several steps. The first step is to initiate the removal process. This may be accomplished by setting the current replica state for the data set to one of the intermediate states described above. If data set properties, including the replica state, are replicated across the enterprise, this action will let other servers in the network know that its copy of the data set is in the process of being removed.

The next step is to terminate user access to the local copy of the data set. If the local copy of the data set is going to be removed, it is unwise to allow users to continue to access the data set. One reason to terminate user access to the data set is to prevent any new changes from being made to the data set during the removal process. If user access was not terminated, these changes may be lost if they occur immediately before removal of the data set. In addition, if continued access to the data set is allowed, when the data set is removed, users will simply see the data set disappear. This may leave them wondering what happened to the data set.

After terminating user access to the data set and initiating the removal process, the next step is to force replication of any changes which have been made to the local copy of the data set and which have not yet been sent to other servers in the network. After the changes are replicated, the server then verifies that the changes reside on at least one other server in the network. By forcing replication of any changes and then verifying that the changes actually reside on another server in the network, inadvertent data loss is prevented.

After the server verifies that all changes held locally are also held by at least one other server in the network, the local server can then delete its local copy of the data set without fear of data loss. After the local copy of the data set has been removed, the server can set its replica state for that data set to a deleted replica state for that data set. This informs other servers in the network that the local copy of the data set is no longer available on this server.

The present invention also includes mechanisms to handle special cases. For example, situations may arise where a server is unable to verify that its local changes are held by another server in the network. Such a situation may arise when an administrator is removing the only copy of a data set from the network or for any number of other reasons. Thus, the present invention includes a mechanism to allow an administrator to bypass the protections provided by the method described above. In one embodiment when such a situation arises, the data set may be left on the server and the replica state of the server may be left in one of the previously described intermediate states. If the data set is left on the server, no user will be able to access the data set but the data set remains on disk and so no data loss is incurred. Such an approach, however, leaves some disk space unreclaimed. Alternatively, embodiments within the present invention allow an administrator to bypass the verification step and force removal of a data set or return the server to the active replica state.

Embodiments within the scope of this invention also provide for an add function which adds a copy of a data set to a server. The add function first adds an empty data set and then fills the data set with data objects.

Finally, embodiments within the scope of the present invention also provide for a move operation which will move a data set from one server to another. In one embodiment, this move operation is accomplished by first adding a copy of the data set to the server that is to receive the data set and then initiating a remove process on the server that will no longer have the data set. The remove process may operate as described above.

Accordingly, it is a primary object of this invention to provide systems and methods for replica administration which prevent inadvertent data loss. Other objects of the present invention include: providing systems and methods for replica administration which allow an administrator to bypass safeguards and force removal of a data set without guaranteeing that inadvertent data loss will be prevented; providing systems and methods for replica administration which minimize the amount of communication traffic which is generated during removal of a data set; and providing systems and methods for replica administration that do not significantly degrade in performance when an increasingly large number of systems are added to the network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
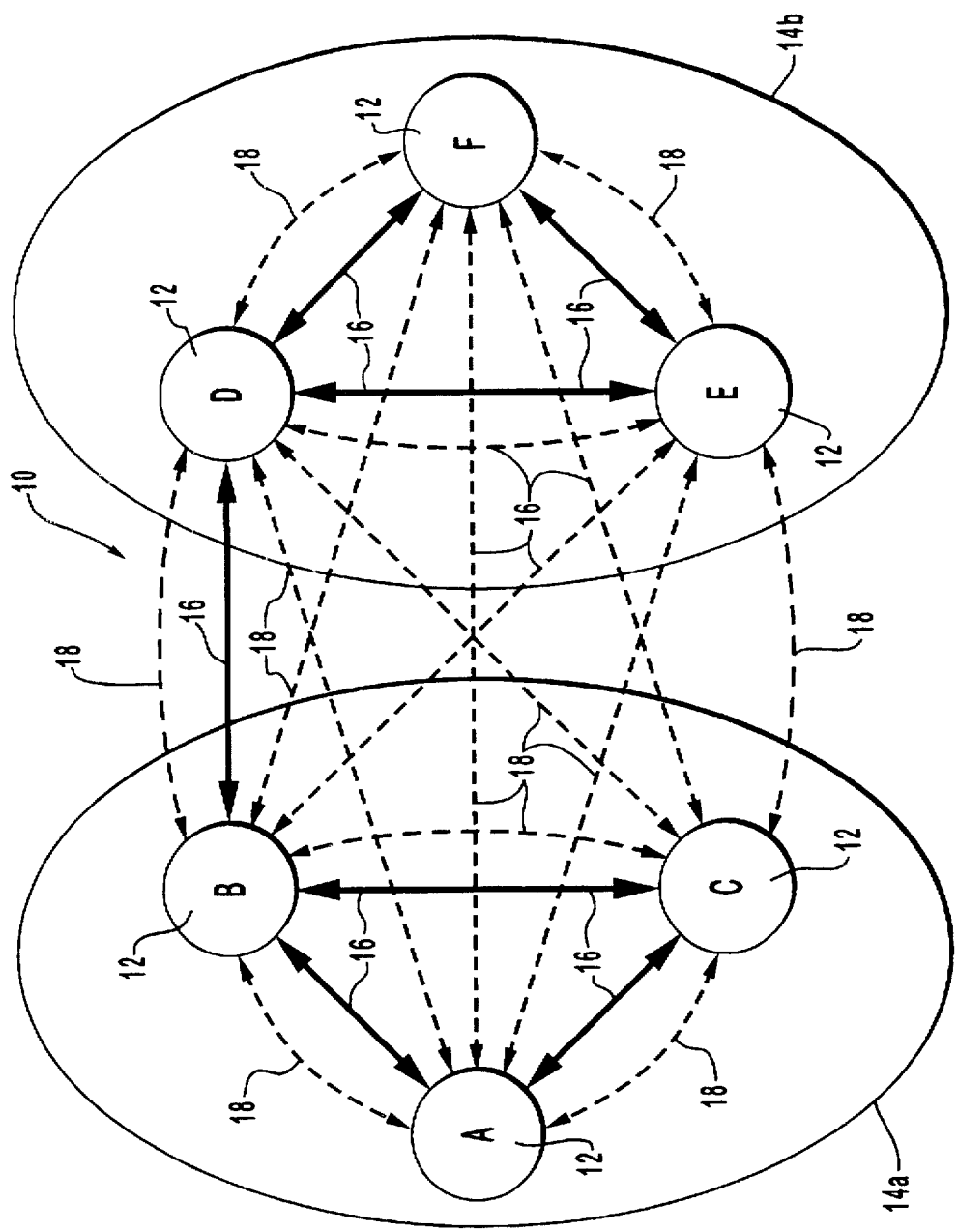
FIG. 1 is a diagram representing a network which is logically completely connected.

The following invention is described by using flow diagrams to describe either the structure or the processing of certain preferred embodiments to implement the systems and methods of the present invention. Using the diagrams in this manner to present the invention should not be construed as limiting of its scope. The present invention contemplates both methods and systems for replica administration without data loss. The presently preferred embodiment of the system for replica administration without data loss comprises a general purpose computer. The systems and methods of the present invention, however, can also be used with any special purpose computer or other hardware system and all should be included within its scope.

Embodiments within the scope of the present invention also include articles of manufacture comprising program storage means having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above should also be included within the scope of program storage means.

Program code means comprises, for example, executable instructions and data which cause a general purpose computer or special purpose computer to perform a certain function or a group of functions.

1. Summary of Store and Forward Replication

The system and method for replica administration without data loss as disclosed herein can be utilized with any type of replication process. However, the systems and methods of the present invention do require some sort of replication process. The presently preferred type of replication process is a store and forward replication process.

Although store and forward replication does not form a specific part of the present invention, an understanding of the basics of store and forward replication is helpful in understanding the details of the present invention. For a detailed discussion of store and forward replication, see copending U.S. patent application Ser. No. 08/673,741, entitled "System and Method for Asynchronous Store and Forward Data Replication" (hereinafter referred to as the "Store and Forward Application"), which is incorporated herein by reference. Asynchronous store and forward replication, or simply store and forward replication, is designed to utilize existing network hardware, networking control software, and networking configurations as a transport system to deliver at least one-way, unacknowledged communications between systems in a replication enterprise. In the context of this application, networking hardware and any associated networking control software which performs this transport function will be referred to as the Message Transport Agent (MTA). One-way, unacknowledged communication means that the store and forward replication process delivers a message to be transferred to the MTA and does not receive feedback as to the success of the transfer. Primarily for efficiency reasons, the systems and methods that are the subject of this invention and the invention described in the copending Store and Forward Application have been designed with the presumption that no acknowledgement or feedback is required. The concepts disclosed in this application and in the copending Store and Forward Application, however, could be modified to use any status or information available from the MTA. Similarly, as previously described, the concepts of this invention do not depend on the type of replication process employed and virtually any type of replication process can be used. However, the store and forward replication process provides the presently preferred context of this invention.

Turning now to FIG. 1, an example of a network over which data is to be replicated is shown generally as 10. In this application, such a network will be referred to as a "replication enterprise" or simply an "enterprise." In a store and forward replication process, a given populated data set (data set properties with associated data objects), a copy of which is referred to as a "replica," and/or a given unpopulated data set (data set properties without associated data objects), is replicated at one or more locations in the enterprise. In FIG. 1, the locations where a replica or a copy of an unpopulated data set can reside are referred to as "replica nodes" and are shown as 12 and labeled A-F. The term "replica node" is preferred over the term "server" since "server" often implies a system which serves one or more desktop, laptop, or other computers. Replica nodes include not only servers in the traditional sense of the term, but also desktop, laptop, or any other system where a copy of a populated or unpopulated data set may reside. In the context of this invention, "replica" will be used to refer to a specific copy of a set of one or more data objects which are to be replicated as a unit across one or more replica nodes. The term is intended to be read broadly and encompasses any type or format of data to be replicated. The term "data set" is used to describe one or more data objects which are replicated as a unit and should be read broadly to refer to a unit of replication. The term "data object" should also be read broadly and includes data such as a data file, a spread sheet, a word processing document, or any other type of data. "Unpopulated data set" or "data set properties" refers to data sets without their associated data objects. The term "replica object" will be used to refer broadly to either a populated or unpopulated data set or to an individual data object or a data set property object. A replica object is thus a unit of replication.

In the enterprise, replica nodes may be grouped into "sites." A site is a plurality of replica nodes with relatively similar costs to access data. Replica nodes within a site are generally, but not necessarily, located in a relatively localized geographic area and have high speed connectivity between nodes, such as, for example, Local Area Network (LAN) connections. The cost to access data between sites is generally much greater than the cost to access data within a site. Site groupings are typically assigned by a system administrator. FIG. 1 shows two sites, designated 14a consisting of replica nodes A, B, and C, and 14b consisting of replica nodes D, E, and F.

Replica nodes are connected by physical network connections. In FIG. 1, the physical network connections 16 are illustrated by the solid arrows. As shown in FIG. 1, replica nodes 12 may not be fully connected by physical network connections 16. (Note that the site containing the A B C group is connected to the site containing the D E F group by only a single link.) For store and forward replication, however, all that is required is the physical connections be sufficient to provide a data flow path between each of the replica nodes. Furthermore, physical connections 16 may be of any type. For example, the physical connections between replica nodes A, B, and C may be a LAN or other high speed link while the connections between replica nodes D and B may be a slower dial up, Internet, Wide Area Network (WAN), or other long haul connection. All these physical network connections are some examples of networking means for connecting replica nodes in an enterprise.

By ensuring a data flow path between each of the replica nodes, the entire enterprise is logically fully connected even though physical connections are of arbitrary topology. In FIG. 1, the logical network connections forming the fully connected logical topology are illustrated by dashed arrows 18.

In a store and forward replication system, each replica node keeps track of all changes made locally to a replica object (either data objects or data set properties). Each replica node then periodically broadcasts new changes that have occurred since the last replication broadcast through the MTA to all other replica nodes having a copy of the replica object. Store and forward replication can be used to distribute both populated and unpopulated data sets. This is done by replicating the contents of data sets (data objects) and the properties that define data sets (data set properties). Data replication in a store and forward replication enterprise can be thought of as the distribution of copies of the contents of a container. In the case of a data set, the contents are the individual data objects that make up the data set and the replication system distributes changes made to the data objects. In the case of the data set list, the contents are the individual data set properties that define each data set.

The relationship of the data set list, the data sets, and data objects, can be illustrated as follows. Each replica node keeps a list of the data sets (whether populated or unpopulated) that it knows about. Usually every replica node in the replication enterprise knows about all data sets in the enterprise. The data set list can be illustrated as:

| Data Set List |
|---|
| Data Set No. 1 |
| Data Set No. 2 |
| • |
| • |
| • |
| Data Set No. n |

Each data set is defined by a set of properties. These properties describe or define important features of the data set. Each entry in the data set list comprises the data set properties of a data set. For example, in one preferred embodiment, each data set (and each entry in the data set list) comprises:

| Data Set Name | Data Set ID | Change Number | Time Last Modified | Replica List | Pointer to Data Objects |
|---|---|---|---|---|---|

The data set name is a common name for the data set that is displayed to users. The data set ID is an identifier that uniquely identifies the data set across the replication enterprise. Any type or form of ID will suffice for this purpose. For example, if the enterprise had synchronized clock values available, each ID could be drawn from the globally synchronized clock value or have the globally synchronized clock value as part of the ID. As another example, one of the replica nodes in the enterprise could be responsible for issuing ID values to all other replica nodes. Other methods could be developed and any method will work. All that is required is the ability to distinguish one replica node from another. One presently preferred method involves generating a Globally Unique ID (GUID) and concatenating it with a local counter value to form a Fast Unique ID (FUID). The GUID is a unique 16 byte value created by concatenating a 60 bit system value, a 4 bit version number identifying which version of the ID generating program is used, a 16 bit clock sequence number that is incremented every time an ID is assigned, and a 48 bit network address drawn from the network hardware of the replica node. A FUID is created by concatenating a GUID with a local counter value that is incremented every time an ID value is assigned. More details of generating GUIDs and FUIDs can be found in the Store and Forward Application, previously incorporated by reference.

The change number is an identifier that essentially acts as a version number for the data set properties. The change number uniquely identifies the change number assigned when the data set properties were last changed. Any type or format of identifiers may be utilized for the change number as long as each change number is unique across the enterprise. In one preferred embodiment, a FUID is used for the change number.

The time last modified is the local time that the properties were last modified.

The replica list is the list of replica nodes having a copy of a populated version of the data set. The replica list acts as a distribution list for replication packets containing changes to the contents of a data set. The replica list may also contain other information, such as a replica state indicating the level of participation of each replica node on the list in the replication of the data set and a time last modified stamp indicating the time that the replica state was last modified.

Although not typically utilized, it would also be possible to have distribution lists for various data set properties. In this way, the location (and even existence) of certain data sets could be kept hidden from certain replica nodes. In conjunction with security measures which restrict access to hidden data sets, the ability to hide data sets from certain replica nodes may be useful in situations where certain users only access the enterprise through a limited number of replica nodes and access to certain data sets by these users is to be restricted. Collectively, the distribution lists used for either data objects or data set properties are referred to as "replica object distribution lists."

Finally each entry in the data set list may have a pointer to a list of data objects. This list of data objects is the contents of the data set. For replica nodes having a populated data set, the pointer will point to the list of data objects. For replica nodes having an unpopulated data set, the pointer will be null.

Other information may also be included in the data set properties. For example, for conflict detection and resolution, it may be desirable to include a predecessor change list that contains a change history of the data set properties. As another example, for hierarchically structured data, a parent property and/or a path property could be included to define the hierarchy of the data sets. Conflict detection and resolution is covered in greater detail in copending U.S. patent application Ser. No. 08/673,161, entitled "System and Method for Distributed Conflict Resolution Between Data Objects Replicated Across a Computer Network," (hereinafter the "Conflict Resolution Application"), incorporated herein by reference. Replication of hierarchically structured data is covered in greater detail in copending U.S. patent application Ser. No. 08/679,209, entitled "System and Method for the Distribution of Hierarchically Structured Data," (hereinafter the "Hierarchical Data Replication Application"), incorporated herein by reference.

To further illustrate the replication of populated and unpopulated data sets, consider that one replica node might receive only replication packets containing data set properties. Assuming that this replica node received the replication packets containing data set properties for all data sets in the enterprise, this replica node will then have a copy of the data set list (or "set of data sets") available in the enterprise. The data objects associated with each entry in the data set list are not available locally, however. This replica node has unpopulated data sets. Another replica node may receive both replication packets containing data set properties and replication packets containing data objects. Assuming that this replica node received all such replication packets, this replica node has copies of both the data set list and the data objects associated with each entry in the data set list. This replica node has populated data sets. It is rare that a replica node has either all populated or all unpopulated data sets. Typically, a replica node will receive replication packets containing data set properties for all data sets and replication packets containing data objects for some data sets. These replica nodes have a complete data set list with some populated data sets and some unpopulated data sets.

In order to track the changes that are made to either the data set properties or the data objects, each change is assigned a unique change number. By assigning a unique change number to any change that is made to a particular replica object, it is easy to track various changes across the enterprise. For example, change numbers may be used to identify if two copies of a particular replica object are the same. If two copies of a given replica object contain the same changes, then the replica objects are the same. The change numbers which form the basis of the present state of a replica object may be stored in a change set. A change set contains one or more groups of changes.

Change numbers and change sets may also be used to identify any changes which are missing from a replica object. As discussed in greater detail hereafter, being able to identify whether particular changes form the basis for a particular replica object is useful for the present invention. Change numbers and change sets can also be used for other purposes such as recovery of changes missing from a particular replica object and identifying conflicts between two copies of the same replica object. Utilizing change numbers and change sets to recover data missing from a replica object is described in greater detail in copending U.S. patent application Ser. No. 08/670,588, entitled "System and Method for Discovery Based Data Recovery in a Store and Forward Replication Process" (hereinafter the "Backfill Application"), incorporated herein by reference. Utilizing change sets and change numbers to identify and resolve conflicts between two copies of the same replica object is discussed in the copending Conflict Resolution Application, previously incorporated herein by reference. More information about general use of change numbers in a store and forward replication process can be found in the copending Store and Forward Application, previously incorporated by reference.

Because copies of a single data set are located at various replica nodes throughout the enterprise, a situation inevitably arises where it becomes necessary to change the locations of copies of a data set. For example, it may become necessary to add a copy of a data set to a replica node, either because a new data set is being created or because it is necessary to add a new copy of an existing data set. Additionally, it may become necessary to move a copy of a data set from one replica node to another, or to delete a copy of a data set from a replica node. Collectively these activities, as well as others, are referred to as "replica administration."

When making changes such as these, care must be taken to prevent inadvertent data loss. Because multiple copies of the same data set exist, and because any one of the copies can be changed at any replica node where they reside, if a local copy of a data set is removed before the changes made to the local copy have been sent to other replica nodes, then those changes will be lost.

2. Summary of Replica Administration Without Data Loss

Although the present invention will be described in terms of administering a group of objects (a data set), the principles of the present invention can be applied to a single data object. Thus, the present invention does not distinguish between dealing with a group of data objects or with only a single data object. The present invention thus embraces replica administration where a data set is defined in broad terms which encompasses any amount or format of data which is replicated as a single unit across an enterprise.

Figure 2:
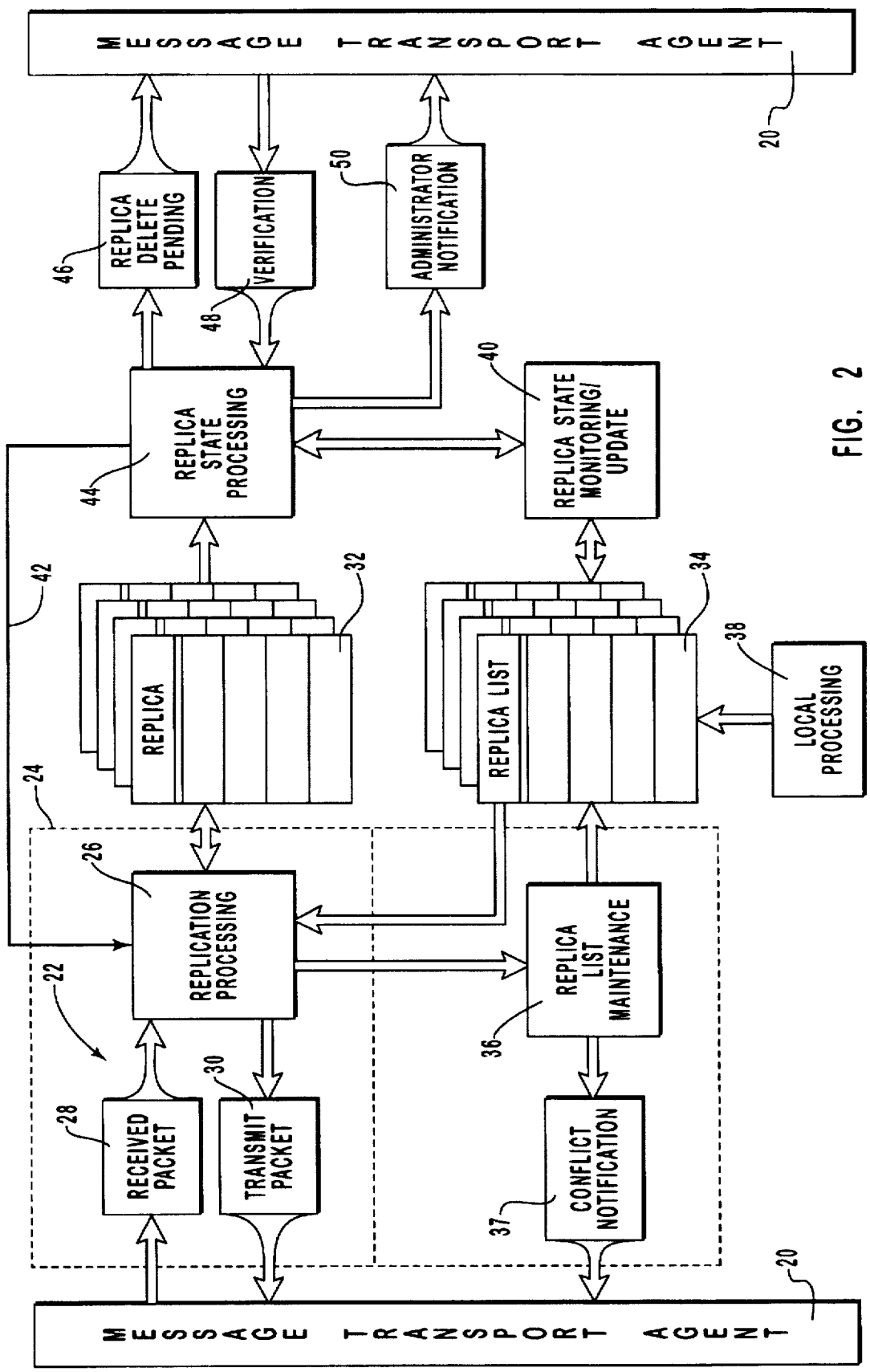
FIG. 2 is a block diagram representing the relationship of one embodiment of the system and method of replica administration of the present invention to an associated replication process.

Referring now to FIG. 2, a simplified conceptual block diagram of one embodiment of the present invention is presented. As previously described, the present invention relies on message transport agent 20 to transport message packets to and from various replica nodes in the enterprise. Furthermore, as previously described, the present invention involves replica administration of data sets replicated across an enterprise by a replication process. Thus, although not part of the present invention, a replication process is presumed. In FIG. 2, the replication process is shown generally as 22 and is located within dashed box 24. The present invention will work with virtually any type of replication process although the preferred replication process is a store and forward replication process, as previously summarized. The preferred replication process distributes both data objects and data set properties, although this is not strictly required as long as some mechanism exists for distributing certain types of data set property information.

In FIG. 2, a generic replication process is illustrated by replication processing block 26. As illustrated in FIG. 2, replication processing block 26 transmits and receives message packets via MTA 20. The received and transmitted packets are illustrated in FIG. 2 by received packet 28 and transmit packet 30. Depending on the type of replication process utilized, received packet 28 and transmit packet 30 can represent a wide variety of message packets that are utilized by replication processing block 26 in order to accomplish data replication and other associated functions. For example, the copending Backfill Application describes four packet types which are used to recover data missing from a replica object. These packet types are a data packet, a data request packet, an information packet and an information request packet.

The present invention as described herein presumes that replication processing block 26 replicates both populated and unpopulated data sets (e.g., data objects and data set properties). Although such a replication process is desired, it is not strictly necessary as long as certain types of data set property information can be shared among replica nodes. The required capability is discussed in greater detail below.

Replication processing block 26 replicates data objects contained in one or more data sets. As illustrated in FIG. 2, a replica node may have a plurality of data sets, one of which is illustrated by replica 32. As previously indicated, a replica comprises copies of one or more data objects which are replicated at various replica nodes throughout the enterprise as a unit. In other words, a replica is a particular copy of a data set located at a particular replica node.

A set of properties may be associated with each data set. These properties, often referred to as "data set properties," include such information as a name and/or other identifying information, access control information such as a list of users which can access the contents of a data set or the properties of the data set, and a list of replica nodes (a replica list) which have the contents of a data set. In addition, data set properties may include other information as described in greater detail below.

Because data set properties are associated with each data set, the data set properties provide a convenient location to store information which is needed by the present invention. As described in greater detail hereafter, the present invention utilizes a "replica state" to indicate the level of participation of each replica node in the data replication of each data set.

For example, the replica state could indicate that a replica node was actively participating in the replication for a particular data set. In addition, the replica state could indicate that the replica node had deleted its local copy of the data set. Finally, the replica state could indicate that the replica node was in the process of deleting its local copy of the data set. In fact, a replica state can be established for any level of participation in the replication of a particular data set. The replica states defined in this application are designed to fulfill the goals of replica administration without data loss. The replica states allow such administration functions as adding a replica, deleting a replica, or moving a replica, while preventing inadvertent data loss and fulfilling the goals of the present invention. Embodiments within the scope of the present invention can comprise means for tracking the replica state of a replica node. By way of example, and not limitation, such means can comprise replica list 34.

Since the store and forward replication process maintains a replica list that contains all the replica nodes which are participating in the replication of a particular data set, the replica list provides a convenient location to store replica state information. One such replica list is illustrated in FIG. 2 as replica list 34. In one preferred embodiment, each entry in the replica list comprises:

| Replica Node ID | Replica State | Time Last Modified |
| --- | --- | --- |

The replica node ID is an identifier which uniquely identifies a particular replica node in the enterprise. Any type or form of ID value may be utilized for the replica node ID as long as the identifier is capable of uniquely identifying a particular replica node in the enterprise. One suitable method for generating a unique replica node ID is summarized later in this application and is more particularly disclosed in the copending Store and Forward Application, previously incorporated by reference. The replica state is the current replica state of the replica node identified by the replica node ID. The time last modified is a time stamp value which indicates the time that the replica state was last modified. The time last modified stamp is utilized in replica list maintenance, discussed below.

Because the present invention utilizes the replica list to store information about the replica state of a particular replica node with regards to a particular data set, and because such replica lists are replicated around the enterprise by replication processing block 26, care must be taken to properly maintain the replica lists, such as replica list 34. In FIG. 2, such a maintenance function is performed by replica list maintenance block 36. Replica list maintenance block 36 is responsible for ensuring that replica list 34 is properly updated as new information is received via replication processing block 26. Such updating includes the resolution of any conflicts which may arise during the replication of replica lists.

Because data set properties, including replica lists, are replicated across the enterprise, and because changes may occur to these data set properties at any replica node, a situation may arise where one copy of the data set properties on one replica node is changed so as to be in conflict with another copy of the data set properties on another replica node. For example, suppose the data set properties included a data set name which could be changed by a user. Now suppose user 1 connected to one replica node changed the name of a data set from A to B. Suppose that, simultaneously, user 2 connected to a different replica node changed the data set name from A to C. In this situation, a conflict between the names would arise and would have to be resolved when copies of the data set properties were exchanged during replication. Similar conflicts can arise with regard to other data set properties in the replica list. Any conflicts which arise must be resolved in a manner that does not create problems for the present invention.

Replica list maintenance block 36 can be part of the present invention, or may be part of another component of the replication process. In essence, all that is required by the present invention is that replica list 34 is updated so that the most recent entries reside in replica list 34 and so that no entries are lost during any conflict resolution process which is utilized. These two requirements may be met by utilizing the time last modified time stamp of the replica list. As previously described, the time last modified time stamp indicates the time which the replica state was list modified. When new information is received via replication processing block 26, replica list maintenance block 36 should compare the received replica list with replica list 34. As corresponding replica list entries are compared, the replica list entry with the later time stamp may be taken as the most current entry. Furthermore, entries having no corresponding entry in the other replica list can be merged into the final list. For example, consider replica list 1 which has entries as follows:

| A | Active | $T_1$ |
| --- | --- | --- |
| D | Deleted | $T_2$ |
| G | Active | $T_3$ | and replica list 2 which has entries:

| A | Active | $T_1$ |
| --- | --- | --- |
| D | Active | $T_4$ |

Now assuming that the higher numbered timed stamps are later in time so that $T_4$ is the latest time stamp and $T_1<T_2<T_3<T_4$, then an updated list containing the most current information from either list 1 or list 2 would be:

| A | Active | $T_1$ |
| --- | --- | --- |
| D | Active | $T_4$ |
| G | Active | $T_3$ |

When the lists are merged, the A entry is identical in both tables and so it is kept without change. The D entry of list 2 has a time stamp of $T_4$ which is later than the D entry of list 1 which has a $T_2$ time stamp. Thus, the D entry of list 2 is taken and the D entry of list 1 is eliminated. The G entry exists only in list 1 and has no corresponding entry in list 2 so the G entry of list 1 is included in the final updated list. A much more detailed algorithm for detecting and resolving conflicts between different copies of the properties of a data set is disclosed in the copending Conflict Resolution Application, previously incorporated by reference. The conflict resolution process as disclosed in the Conflict Resolution Application is suitable for use in replica list maintenance block 36.

When a conflict is recognized and resolved by replica list maintenance block 36, it may be desirable to inform one or more users that a conflict has been recognized and resolved. Embodiments within the scope of the present invention may comprise means for notifying one or more users of a conflict. In FIG. 2 such means is illustrated, for example, tby conflict notification packet 37. The information in conflict notification 37 can be simple, such as a notification that a conflict was noted and resolved, or can be more detailed, such as a detailed explanation of what the conflict included and how it was resolved. Also, notification may be sent to any number of individuals. For example, it may make sense in some implementations to send notification to an "owner" of the data set and to the individuals which made the changes that created the conflict. Other combinations are possible.

As explained in greater detail in the Conflict Resolution Application, many conflict resolution processes are structured so that each replica node will recognize and resolve the conflict in exactly the same way. If such an algorithm is used, care must be taken not to send multiple notifications of the same conflict. Therefore, when such a process is used, it may be desirable to designate one replica node as a data set's "home server" and let only that replica node send conflict notification. More details about such a scheme can be found in the copending Conflict Resolution Application, previously incorporated herein by reference.

Because the replica state represents the level of participation in the replication process of a particular data set by a particular replica node, the process of administering data sets will involve changing the replica state of a replica node. As described in greater detail hereafter, replica administration functions such as adding a copy of the data set to a replica node, deleting a copy of a data set on a replica node, and moving a copy of a data set from one replica node to another, involve an orderly transition from one replica state to another replica state, with certain functions being performed in each replica state. Embodiments within the scope of the present invention can therefore comprise means for changing the replica state of a replica. By way of example, and not limitation, in FIG. 2 such means can comprise local processing block 38 and/or replica state monitoring/update block 40.

As defined in greater detail below, state transition is initiated when a certain event occurs or when one or more conditions are satisfied. In FIG. 2, as such events or conditions occur, the replica states stored in replica list 34 may be updated or modified by local processing block 38 or replica state monitoring/update block 40. As the replica states are updated and stored in replica list 34, replication processing block 26 will distribute the changes to other replica nodes in the enterprise. Thus, other replica nodes in the enterprise will have an updated replica list illustrating the current replica state of the replica nodes on the replica list.

Embodiments within the scope of the present invention can comprise means for monitoring the replica state in order to detect transitions from one state to another. By way of example, and not limitation, in FIG. 2 such means as illustrated by replica state monitoring/update block 40. If a state change is initiated at another replica node and received via replication processing block 26, or if the local replica state is changed via local processing block 38, then a process must be in place to monitor the local state change and take appropriate action. Such a monitoring function may be performed by replica state monitoring/update block 40. Replica state monitoring/update block 40 can then pass the replica state information to replica state processing block 44 to perform the appropriate processing.

As disclosed in greater detail hereafter, before a copy of the data set is removed from a replica node, in order to guard against inadvertent data loss a predefined series of steps are taken. In one embodiment, the series of steps includes forcing replication of changes which have been made to local replica 32 and/or the data set properties associated with replica 32 (including replica list 34). Embodiments within the scope of this invention can therefore comprise means for initiating replication of changes which have been made but which have not yet been previously replicated. In FIG. 2, such means can comprise, for example, control 42. As illustrated in FIG. 2 control 42 provides a mechanism for replica state processing block 44 to direct replication processing block 26 to initiate replication of the changes which have been made but which have not yet been replicated.

In FIG. 2, replica state processing block 44 is responsible for the main processing which takes place during replica administration. For example, replica state processing block 44 will receive notification of a state change from replica state monitoring/update block 40 and then take appropriate action according to the replica state.

Another step in one process to remove a copy of a data set from a replica node is to verify that the changes which reside locally, as for example in replica 32, also reside somewhere else in the enterprise. If it can be determined that the changes which reside locally also reside somewhere else in the enterprise, then the copy of the data set contained in replica 32 may be safely deleted without risk of inadvertent data loss. As described more fully hereafter, this process may involve a handshaking procedure. Such a procedure may be accomplished by sending and receiving various information packets. Thus, embodiments within the scope of this invention can comprise means for verifying that the changes which are held locally reside elsewhere in the enterprise. By way of example, in FIG. 2 such means can comprise replica delete pending packet 46 and verification packet 48. As described in greater detail below, a handshaking procedure between the local replica node and other replica nodes in the enterprise may involve the sending and receiving of information packets. For example, the local replica node can send a packet asking if the locally held changes reside elsewhere in the enterprise. If those changes reside elsewhere, then a response may be sent. By sending and receiving such requests and responses, the verification process may proceed. Other ways are available to accomplish this same verification process, as described in greater detail below.

If during the verification procedure the local replica node is unable to determine whether the locally held change resides elsewhere in the network, then it may be desirable to inform an administrator that the verification process was unsuccessful. Embodiments within the scope of this invention can therefore comprise means for notifying an administrator if attempts to verify that the changes made to the local copy of the data set reside on at least one other replica node are unsuccessful. By way of example, and not limitation, such means can comprise administrator notification packet 50.

The above description has presented the various components which can be used to implement an embodiment of the present invention. However, the description above has not focused on specific administration functions. The section below describes the administration functions and the processing which occurs to achieve these functions in greater detail.

3. Description of Replica Administration Without Data Loss

One goal of the present invention is to create a process for replica administration which prevents inadvertent data loss during replica administration in general and during replica removal in particular. In order to accomplish this goal, embodiments within the scope of this invention can comprise means for defining various replica states that reflect the status of the replica node. For example, embodiments of this invention can comprise means for defining an active state of a replica node where changes made to a local copy of a data set by the replica node are transmitted to at least one other replica node and where changes made to a copy of the data set stored at another replica node are transmitted to the local replica node. In other words, such an active state indicates that the local replica node is fully participating in replication of a particular data set.

Embodiments within the scope of the present invention may also comprise means for defining a deleted state where the local copy of a data set has been removed from the local replica node so that the local replica node no longer holds a copy of the date set. In other words, such a deleted state would indicate that a replica node is no longer participating in the replication of a particular data set.

Embodiments within the scope of this invention may also comprise means for defining at least one intermediate state of a local replica node where the local replica node flushes any unreplicated changes to at least one other replica node in the enterprise and then verifies that all information in the local copy of a data object resides on at least one other replica node. In other words, one or more intermediate states would indicate various steps in the removal process. As explained below, one embodiment comprises two intermediate states.

By defining various states and then replicating the state information among replica nodes in an enterprise, each replica node receiving such information can be informed of the status or participation of all other replica nodes in the enterprise with respect to the various data sets which are being replicated in the enterprise. In short, such state information is an example of means for tracking the replica state of a replica node with respect to a data set. Such information is also an example of means for informing other replica nodes of the degree of participation of a particular replica node with respect to a particular data set. It will be understood by those with skill in the art that such state information can be used not only to inform other replica nodes of the degree of participation in the replication of a particular data set, but may also be used to define an orderly process to achieve replica administration. States can therefore describe the function or activity of a replica node with respect to the replication of a particular data set.

Figure 3:
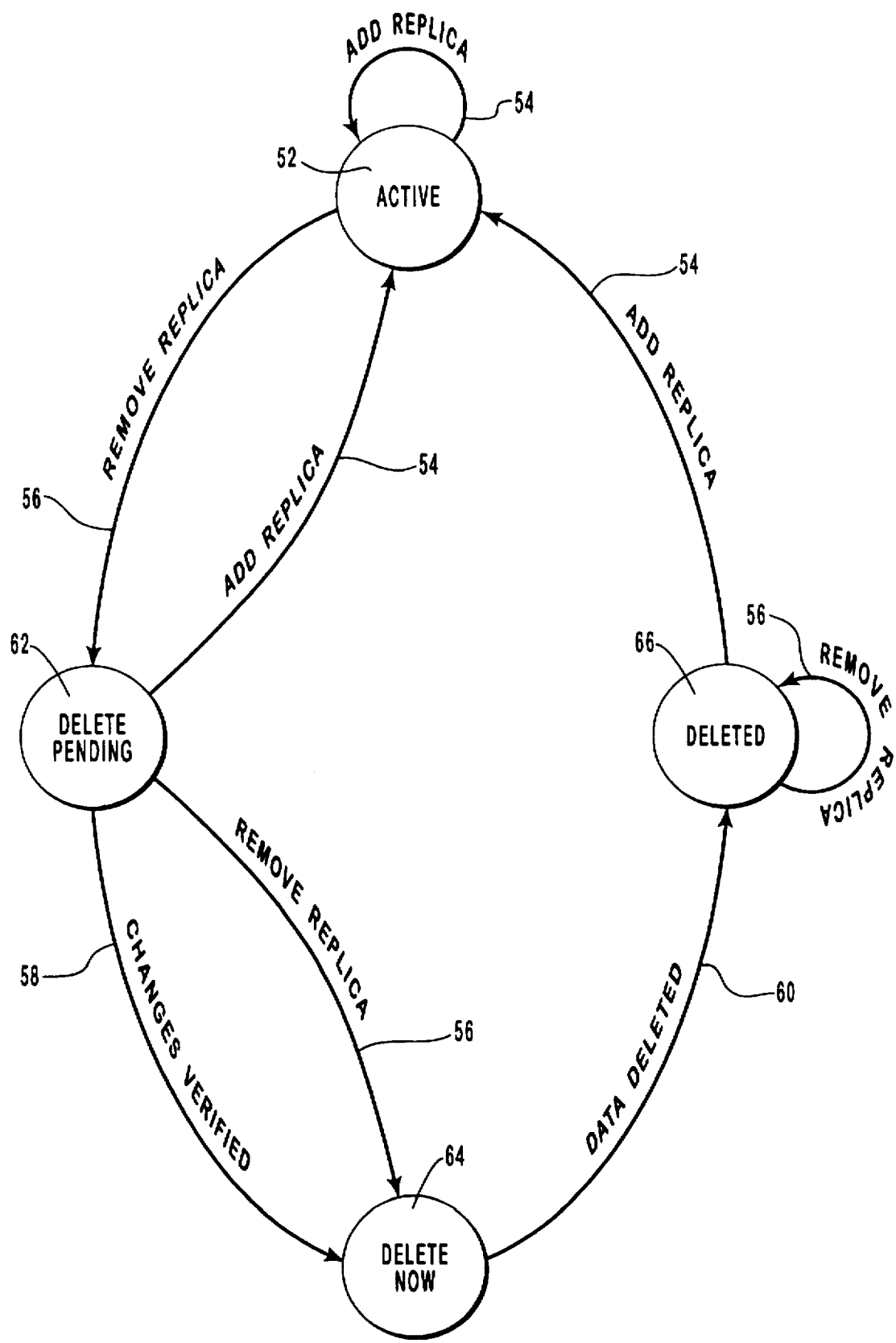
FIG. 3 is a state diagram illustrating the replica states of one preferred embodiment.

Referring now to FIG. 3, a state transition diagram describing one preferred embodiment of the present invention is illustrated. As previously mentioned, embodiments within the present invention can comprise means for defining an active state of a replica node. In FIG. 3, such means is illustrated by active state 52. When a replica node is in the active state with respect to a particular data set, the replica node is fully participating in the replication of that data set. The active state thus represents the state of normal participation in the replication process. Referring briefly to FIG. 2, in the active state replication processing block 26 is functioning normally and is replicating data set objects and/or data set properties throughout the enterprise as previously described.

Embodiments within the scope of this invention can comprise means for initiating transition from one state to another. By way of example and not limitation, in FIG. 3 such means is illustrated by state transition events 54, 56, 58, and 60. In FIG. 3 state transition events 54, 56, 58, and 60 illustrate events or conditions which initiate transition from one state to another state. In FIG. 3 state transition event 54 is labeled "add replica," state transition event 56 is labeled "remove replica," state transition event 58 is labeled "changes verified," and state transition event 60 is labeled "data deleted." State transition controls 54 and 56 represent events which are typically initiated by an administrator as, for example, through local processing block 38 of FIG. 2. State transition controls 58 and 60 represent other events which are generated when certain conditions are met, as, for example, by replica state monitoring/update block 40 of FIG. 2 or by replica state processing block 44 of FIG. 2.

Returning for a moment to FIG. 2, as previously described replica list 34 is preferably part of the data set properties which are replicated across the enterprise by replication processing block 26. In one preferred embodiment, replication processing block 26 represents a store and forward replication process. As previously described, the store and forward replication process will replicate copies of data sets to replica nodes on the replica list for that particular data set. Additionally, in one preferred embodiment, data set properties are replicated to every replica node in the enterprise. This means that all replica nodes in the enterprise have available to them the replica list for each data set which is being replicated across the enterprise. Each replica node in the enterprise therefore knows which data sets are being replicated across the enterprise, which replica nodes have copies of the data sets, and the replica state for each replica node on each replica list.

If each replica node on the enterprise has available the replica state for the replica nodes involved in replicating each data set across the enterprise, then the replica state can be used to initiate a change from one replica state to another replica state. In one preferred embodiment, a system administrator does not change the replica state directly but only issues add or remove commands to change the replica state information in replica list 34 for a particular replica node. In FIG. 2, such a change can occur via local processing block 38. If the administrator generates a state change event (such as add replica event 54 or remove replica event 56 of FIG. 3), then the state information in replica list 34 can be changed by local processing block 38. If the replica state information in replica list 34 pertains to the local replica node, then replica state monitoring/update block 40 will recognize that a state change has occurred and will notify replica state processing block 44 to take appropriate action. If, however, the change made to the replica state pertains to another replica node in the enterprise, then when the data set properties (including replica list 34) are replicated via replication processing block 26 and received by the appropriate replica node, its replica state monitoring/update block will recognize the state change and also take appropriate action.

Replicating data properties in this manner creates two fundamental advantages. First it allows each replica node to receive any changes made to their replica state regardless of where the change originates. This allows an administrator to perform replica administration for any replica node while connected to any other replica node. The second advantage is that by replicating data set properties, including replica state information, each replica node knows how to treat other replica nodes. For example, if a user is connected to a replica node which does not have a local copy of a particular data set that the user wishes to access, then the replica node can check the replica list for that data set and discover which replica nodes have an active copy of the data set. Access to the data set is thus gained indirectly.

Such an approach provides a highly robust administration and information network which allows users connected to any replica node to quickly gain access to the information they desire while allowing the local replica node to handle the details of where to find and access the desired information. Such a scheme hides the details of the replication enterprise from the user and requires no knowledge on the part of the user other than the knowledge of which data set he or she wishes to access. There is no cumbersome hunting for information that resides "somewhere" out there in the network.

a. Remove Replica Process

FIGS. 3 through 6 will now be used to describe a replica removal process of the present invention. This process is designed to remove a replica while providing safeguards which prevent inadvertent data loss during the removal process. The removal of a replica in accordance with this process requires several steps. The steps may be summarized as:

1. Initiate the replica removal process;
2. Terminate user access to the replica;
3. Flush unreplicated changes;
4. Verify that the local data set contents are available at another replica;
5. Remove the contents of the local data set; and
6. Remove the replica from the replica list.

In FIG. 3, the functions disclosed in the list above are broken up between delete pending state 52, delete now state 64, and deleted state 66. In the discussion below, reference is sometimes made to the fact that a replica node will enter a particular replica state. Those skilled in the art will recognize that such a statement means that the particular data set on that particular replica node is in the designated replica state. Put another way, the statement means that a particular replica node is in the designated replica state with respect to the designated data set. Other data sets on the same replica node may be in different replica states.

Suppose, for example, that a replica node was in the active state for a particular data set. In FIG. 3, the replica node would then be in state 52. Furthermore, the data set properties for that particular data set would have an "active" replica state identifier for that particular replica node. Now suppose an administrator initiates a remove replica command. The local replica node, once it receives that event, must then make the transition for that particular data set from the active state to another state where the replica removal process is initiated. It is undesirable to jump directly from the active state to a state where the replica is deleted. As previously explained, this creates a situation where data loss may occur. Embodiments within the scope of this invention may therefore comprise means for defining at least one intermediate state between the active state and the deleted state where certain functions and checks are done to prevent inadvertent data loss. In FIG. 3, two intermediate states are shown, delete pending state 62 and delete now state 64.

When a replica node is in active state 52 and receives a remove replica event, remove replica event 56 indicates that the replica node transitions from active state 52 to delete pending state 62. As previously described, this may occur when replica state monitoring/update block 40 of FIG. 2 recognizes a state change for the local replica node in replica list 34 and passes that information to replica state processing block 44 of FIG. 2. When the replica node transitions to delete pending state 62, the replica node will perform the steps 2-4 listed above: terminate user access to the replica; flush unreplicated changes; and verify that the local data set contents reside at another replica node. In addition, if the transition from the active state to the delete pending state was made locally, the replication engine must also broadcast the locally made change to the data set's replica list. The initiation of the replica removal process occurs when the transition to delete pending state 62 is initiated.

Figure 4:
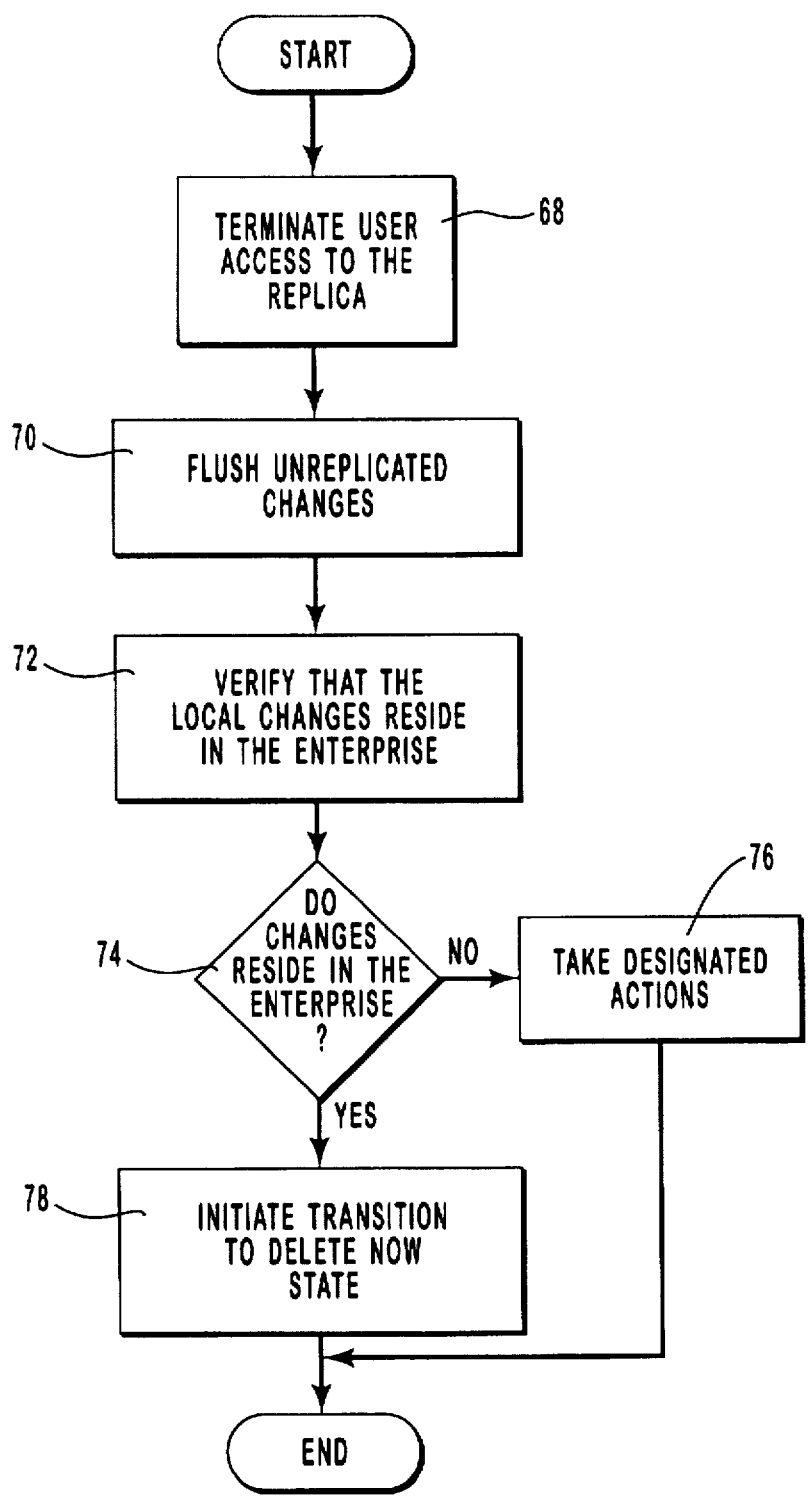
FIG. 4 is a flow diagram illustrating the processing which takes place in the delete pending state of one preferred embodiment.

FIG. 4 illustrates the processing which occurs in one preferred embodiment upon entering delete pending state 62. When delete pending state 62 is entered, the first step is to terminate user access to the local copy of the data set which will be removed. This is indicated in FIG. 4 by step 66. It is important to terminate user access when a replica is to be removed. This importance flows from two considerations. The first consideration is that since the local copy of the data object is about to be removed it would be unwise to allow a user to continue to make changes to the local copy of the data set. Since one goal of the present invention is to allow the removal of a local copy of a data set without data loss, if a user were to continue to make changes to a data set, the process of the present invention would have to continually ensure that those changes were preserved so they would not be lost. If a user continually made changes to the data set, a situation may arise where the system is unable to remove the local copy of the data set. At some point then, user access to the local copy of the data set must be terminated. Terminating access to the local copy of the data set early in the process allows the orderly removal of the data set to occur in the shortest period of time while also providing a simplified removal process.

The second consideration in terminating user access flows from what the user will see on his or her computer screen as the data set is removed. Since the data set exists on the system to provide information needed by a user, it is reasonable to assume that the user will at some point access the information. Perhaps the user will have displayed on his or her computer screen a listing of data sets or data objects. If the user was allowed to continually view the local copy of the data set when the data set was removed, the user would see the data set simply disappear from his or her computer screen without any explanation or indication as to what happened to the data set. By terminating access to the data set, the user will be forced to access a different copy of the information on a different replica node.

As previously described, users may access a data set either locally or indirectly through another replica node. Because it is likely that copies of a particular data set only reside at certain locations in the network, then all access to that data set must be at one of the locations where a copy of the data set resides. If a user is connected to a replica node which does not have a copy of the data set, then the replica node will access a copy of a data set on another replica node in the enterprise. This creates a situation where access to a particular Copy of the replica node may either be locally, for users connected to the local replica node, or remotely, for users connected to other replica nodes not having a copy of the data set. When terminating user access to a copy of a data set, both types of access must be terminated. This may be accomplished in several ways. One way is for the local replica node to refuse connections to the local copy of the data set. Access requests from other replica nodes can then be returned as unfillable because access is prevented. Local access can be prevented in much the same way. Indirect access to the local replica may also be prevented by screening access requests at the remote replica node. Since the replica state information is preferably available at all replica nodes, each replica node will know when the replica at another replica node enters the delete pending state. Access requests to that replica node can then be halted. An error message can then be sent to users which are accessing that copy of the data set. The users can then close the data set and reopen it to establish a connection to another valid copy of the data set. In a preferred embodiment, access requests to a data set or the contents of a data set, always check the replica list property to see if the folder is accessible.

Other issues exist which must be addressed when a replica node enters the delete pending state. The delete pending state is an intermediate state which indicates that a replica node has initiated the process of removing its local copy of the data set. However, the local copy of the data set has not yet been removed. Furthermore, an examination of FIG. 3 will reveal that if a replica node is in the delete pending state and receives an add replica command, then the replica node will return to the active replica state. In other words, the delete pending state represents a state where the replica node is likely to proceed and delete its local copy of the data set, but may also return to the active replica state.

This creates a question as to whether continued changes to the local copy of the data set should be replicated to a replica node in the delete pending state. On the one hand if changes made by other replica nodes to the local copy of the data set are sent to a replica node in the delete pending state, and if the replica node uses those changes to update its local copy of the data set, then if the replica node proceeds to delete its copy of the data set entering those changes has, in some sense, been wasted. On the other hand, if changes made by other replica nodes are not sent to a replica node in the delete pending state, and if the replica node then returns to the active replica state, its local copy of the data set will be missing all the changes which have occurred while the replica node was in the delete pending state. Either way of treating a replica node in the delete pending state will probably work as long as a mechanism exists in the replication process to recover any changes which are missing from the local copy of the data set. Such processes are described in the copending Backfill Application, previously incorporated herein by reference. In one preferred embodiment, changes made to a data set are sent to replica nodes in the delete pending state. In another preferred embodiment, changes made to a data set are not sent to a replica node in the delete pending state.

The next step in the removal process is to force any changes which have been made to the local copy of the data set to be replicated via the replication process, such as replication processing block 26 of FIG. 2. Embodiments within the scope of this invention can, therefore, comprise means for initiating replication of changes which have been made but which have not yet been previously replicated. In FIG. 4 such means is illustrated, for example, by step 70. In order to flush any unreplicated changes to be replicated out to the enterprise, it may be desirable to provide a mechanism which causes the replication process to transmit any unreplicated changes. For example, in FIG. 2 such a structure is illustrated, by control 42 running between replica state processing block 44 and replication processing block 26. Forcing the replication of changes places those changes in the enterprise so they will not be lost when the local copy of the data set is removed.

In order to prevent data loss during the removal process, embodiments within the scope of this invention can comprise means for verifying that the changes which have been made to the local copy of the data set reside on at least one other replica node in the enterprise. For example, in FIG. 4 such means is represented by step 72. Any mechanism which allows a local replica node to ascertain whether the information contained in the local copy of the data set which is about to be removed resides somewhere on the enterprise can be used for such means.

In order to verify that locally held changes reside elsewhere in the enterprise, a handshaking procedure can be used to verify whether the local changes do, in fact, reside in the enterprise. Such a handshaking procedure generally involves the sending and receiving of one or more messages which allow the exchange of information necessary to make the appropriate determination. In one preferred embodiment, the means for transmitting a message to at least one other replica node in order to make this determination involves selecting one or more replica nodes to receive the message, transmitting a message to the selected replica node(s) and then waiting for a response. The means for verifying that the changes which have been made locally reside on at least one other replica node in the network can, therefore, comprise means for transmitting to at least one other replica node a message to determine whether the local changes reside in the enterprise. In FIG. 2, for example, such means is illustrated by replica delete pending packet 46.

The message which is transmitted is called a replica delete pending packet such as replica delete pending packet 46 of FIG. 2. The replica delete pending packet may be either a special type of packet or may be one of the other types of packets used during data replication. In one embodiment, an information request packet, such as those described in the copending Backfill Application, previously incorporated by reference, is used. A replica delete pending packet preferably comprises:

| Local Replica Node ID | Data Set ID | Request Type | Local Change Set |
|---|---|---|---|
| | | | |

The local replica node ID is a name or other identifying information which allows other replica nodes in the enterprise to uniquely identify which replica node is sending the packet. Any form or type of ID will work as long as it uniquely identifies the local replica node. In one embodiment, a GUID value is used for the replica node ID. The data set ID is any identifying information that corresponds to the data set, a copy of which is to be removed from the local replica node. Any type of identifying information can be used as long as it allows other replica nodes in the enterprise to uniquely identify the relevant data set. In one embodiment, a FUID value is used for the data set ID. The request type is used to identify the type of request packet being sent and received. In the instant case, request type is "replica delete pending" or a value which is interpreted as a replica delete pending packet. This field is particularly useful if this packet is one type of a general class of messages. For example, the Backfill Application, previously incorporated by reference, defines an information request packet. The replica delete pending packet may be a type of information request packet. The local change set is the set of changes held by the local replica node for this data set.

As illustrated above, replica nodes or data sets must often be identified uniquely across the replication enterprise. Any type or form of name or ID may be utilized as long as the selected identifier can uniquely distinguish either the replica node or the data set across the entire replication enterprise. For example, if the enterprise had synchronized clock values available, each ID could be drawn from the globally synchronized clock or have the globally synchronized clock value as part of the ID. As another example, one of the nodes in the enterprise could be responsible for issuing ID values to all other nodes. Other methods could be developed, and any method which generates unique IDs fitting the specified criteria will work. All that is required is the ability to distinguish local replica nodes or data sets uniquely among the enterprise.

In one preferred embodiment, IDs for date sets are generated by concatenating a unique replica node ID value with a counter value that is incremented every time an ID value is assigned. The unique replica node ID portion is sometimes referred to as a Globally Unique ID (GUID). The GUID value is typically generated through a process that is somewhat lengthy and may have various components which help to form the GUID. Such components can include a system time value, a clock sequence or counter value, a network address value, and so forth. In the case of the replica node ID value described above, one preferred embodiment utilizes a GUID for the local replica node ID. Further details of one way to generate GUID values are contained in the copending Store and Forward Application, previously incorporated herein by reference.

In some cases, perhaps for data set ID values, it may be desirable to concatenate a local counter value with a GUID value to create the resultant ID value. Such a local counter value could be incremented every time an ID value was assigned by a particular replica node. This type of ID is sometimes referred to as a Fast Unique ID (FUID). Thus, when a data set is created on a replica node by a user, then a data set ID could be assigned to that data set by creating a FUID by concatenating a local counter value with the replica node ID for that replica node. This data set ID could then be replicated among all other replica nodes and would uniquely identify the data set. Such a scheme has many advantages and creates a simplified method of rapidly creating ID values which are unique across the enterprise. FUID values can be rapidly created because a counter only needs to be incremented to achieve the next unique ID value. FUID values are unique across the replication enterprise because the replica node ID is unique across the enterprise and because the counter value is incremented every time an ID value is assigned. Thus, the same ID value will never by used twice. Further details of this method can also be found in the copending Store and Forward Application, previously incorporated by reference.

In one preferred embodiment the replica delete pending packet also comprises the local change set. As discussed previously, the local change set contains information which allows other replica nodes in the enterprise to determine the changes contained in the local copy of the data set. When a replica node receives a replica delete pending packet, the replica node compares the change set contained in the replica delete pending packet to its own local change set. This comparison will reveal whether the local change set contains at least the changes in the change set of the replica delete pending packet. In one preferred embodiment, a replica node receiving a replica delete pending packet will respond if the local change set contains at least the changes in the change set received in the replica delete pending packet. When the replica node that is deleting its local copy of the data set receives such an acknowledgement, it will know that it can safely delete its local copy of the data set.

In FIG. 2, the packet which is sent in response to a replica delete pending packet is illustrated by verification packet 48. As in the case of replica delete pending packet 46, verification packet 48 may be a special type of packet or may be a type of a general class of packets. For example, the copending Backfill Application describes an information packet. This information packet contains, among other things, the change set of the replica node sending the information packet. Verification packet 48 of FIG. 2 may be implemented using an information packet like the information packets described in the copending Backfill Application. Any type of packet will work as long as the replica node receiving the verification packet can identify that the verification is in response to the replica delete pending packet or if the verification packet has sufficient information to allow the local replica node to ascertain that the changes held vocally reside on one or more other replica nodes in the enterprise.

For certain implementations of replication processing block 26 of FIG. 2, special consideration must be given to the handshaking process. For example, certain replication processes implement the concept of time-based expiration of data. Time-based expiration of data refers to deleting data that is older than a specified time. One area where time-based expiration of data may be useful is in the area of E-mail messages. The utility of E-mail messages typically declines with increasing age. Messages that are several months old are typically of no further use to their intended recipient. In order to eliminate data which is not useful as it ages, time-based expiration may be used. When a given data object is older than a set time, as for example two weeks, the data object is deleted automatically. In a replication environment, time-based expiration results in a situation where changes older than a certain time are deleted from a replica node. Because an enterprise comprises many different replica nodes, each replica node may expire data at a different time. For example, one replica node may delete all data older than one week. Another replica node may delete all data older than six months. Still another replica node may never delete old data. In such an enterprise, if the replica node which never expired data wanted to delete its local copy of a data set, it would send a replica delete pending packet to the other replica nodes in the enterprise.

A question then exists as to whether a replica node that once held changes but has now expired and deleted them should respond to a replica delete pending packet requesting verification that the changes which have expired exist in the network. On the one hand, if a replica node that once held the changes but which has now expired and deleted them responds to a replica delete pending packet, a situation may arise where the changes which are deleted do not in fact reside in the enterprise. On the other hand, if replica nodes which have once held changes but have now expired and deleted them do not respond to a replica delete pending packet, a situation may arise where a replica node wishing to delete its local copy of the data set may never be able to verify that the changes exist in the enterprise. This situation represents a design choice in the implementation of the verification process and each choice has its own advantages and disadvantages. Either way of implementing the verification process in the face of expired data will work, but each will have different consequences in the operation of the replication enterprise. In one embodiment of the present invention, replica nodes will respond if they once held the changes in the replica delete pending packet even though those changes have now expired and have been deleted. Other embodiments of the present invention may implement a handshaking procedure where only those replica nodes which currently have the changes will respond.

In order to maximize the probability of receiving a response to a replica delete pending packet, it is preferred that replica nodes receiving a replica delete pending packet treat such a packet as a high priority request and respond to such requests in a relatively short period of time.

Although the preceding section has described a verification process wherein the replica node which is about to delete a local copy of a data set sends a packet requesting other replica nodes to respond if they have at least the information that is about to be deleted, other handshaking methodologies which verify that the information that is about to be deleted resides on the enterprise can be utilized. For example, a verification process where a replica node responds to a request if the replica node has at least the information that is about to be deleted can, under certain circumstances, fail to detect that the data that is about to be deleted collectively resides in the enterprise. For example, consider replica node A where the local copy of the data set has changes 1, 2, and 3. Now consider replica node B that has changes 1 and 2 and replica node C that has changes 2 and 3. In such a situation, if A was about to delete its local copy of the data set, it would send a replica delete pending packet to replica nodes B and C. Replica nodes B and C would respond if they had at least the changes held by replica node A. In this example, neither replica node B nor C will respond since replica node B does not have change 3 and replica node C does not have change 1. In actuality, however, all the necessary changes do, in fact, reside on the enterprise.

In order to detect such a situation, a verification process could be developed in which replica nodes B and C send their change sets to replica node A rather than the other way around. In such a verification process the replica node that is about to delete its local copy of the data set could send request packets to various replica nodes throughout the enterprise. These replica nodes would then respond with their own local change set. The replica node which is about to delete its local copy of the data set can then determine whether the relevant changes collectively reside on the enterprise. Such a scheme will likely generate more message traffic on the network than a method where replica nodes respond if they have at least the changes which are to be deleted. However, this example illustrates that a wide variety of verification processes can be developed that have sufficient capability to be utilized with the present invention.

The above situation could also be resolved by including a data recovery component, such as that described in the copending Backfill Application. Such a backfill mechanism will allow nodes B and C to synchronize their changes so that each has a complete set of changes. Either B or C could then respond to node A so that node A could then delete its local copy of the data set.

Returning now to FIG. 4, decision block 74 tests whether the changes which form the basis for the local copy of the data set resides in the enterprise. If the changes do not reside in the enterprise, then step 76 indicates that appropriate action should be taken. The question becomes what appropriate action should be taken. Step 76 is reached if the local replica node cannot verify that the changes that reside locally also reside on the enterprise. In this situation, four basic options are available.

The first option which is available is to take no action at all. If this option is chosen, little adverse effects are incurred and data loss is prevented. When a replica node is in the replica delete pending state, all user access to the local copy of the data set has been terminated. Thus, no user can access or utilized the data in the local copy of the data set. In fact, as previously described, no other replica nodes will try and access the local copy of the data set and so, for all intents and purposes, such a data set is effectively placed beyond reach. It is apparent, however, that the final step of removing the local copy of the data set has not yet been completed. So, if no action is taken, then the primary adverse effect is that the disk space occupied by the local copy of the data set has not been reclaimed. Obviously, if data sets are rather large, then disk space could be eaten up fairly quickly if it is not reclaimed. Furthermore, if the selected implementation continues to replicate data to data sets in the delete pending state, the amount of disk space used can increase over time. On the other hands the data still physically resides on the replica node and can be recovered if desired.

A second option would be to automatically force the replica node back to an active replica state. This would place the data back into use and allow users to access the local copy of the data set. Although this option has the benefit of preventing data loss, it may also frustrate the intent of an administrator who desires to remove the local copy of the data set from the replica node.

Rather than automatically forcing the replica node back to an active state, another option is to automatically force the replica node into the delete now replica state. As explained below, in the delete now replica state the local copy of the data set is deleted. Thus, forcing a replica node into the delete now state would create a risk of inadvertent data loss. On the other hand, it would guarantee that all disk space occupied by the local copy of the data set will be reclaimed.

A final option would be to notify the administrator that the replica node was unable to verify that its changes reside in the enterprise. An administrator could then examine the situation and make a determination what should be done. In such a situation, the administrator may choose to do nothing, force the replica node into the active state, or force the replica node into the delete now state. Referring to FIG. 3, the state diagram indicates that from delete pending state 62 if an add replica event is received, the replica node would transition into active replica state 52. This is indicated in FIG. 3 by add replica event 54. If, however, a remove replica command is received, then remove replica event 56 indicates that the transition would be from delete pending state 62 to delete now state 64.

In the above, option 1 (do nothing) and option 4 (notify the administrator) are identical except for the notification of an administrator. In either case, nothing is done with the data set until further direction is received. In one case, an administrator is left to discover that the replica node is perpetually in the delete pending state while in the other option the administrator is notified that the replica node is perpetually in the delete pending state. Any of the above four options can be utilized with the present invention and which option is chosen is a design choice. When making such a design choice, however, careful consideration should be given to the effects of each of the above choices.

There are situations and times where it is desirable to allow an administrator to bypass the safeguards put in place by the present invention, as for example if a replica node becomes stuck in delete pending state 62 of FIG. 3. Embodiments within the scope of this invention can, therefore, comprise means for bypassing the verification process so that the local copy of the data set can be deleted without verifying that the changes reside on at least one other replica node. In FIG. 3, such means is indicated by remove replica event 56. As previously described, an administrator can issue a command to generate a remove replica event. If such an event is received while the replica node is in delete pending state 62 of FIG. 3, then remove replica event 56 indicates that the replica node would transition from delete pending state 62 to delete now state 64. Although not shown explicitly in FIG. 4, if a remove replica event is received, then processing is suspended and the delete now state is entered. A remove replica event would cause the replica state in replica list 34 of FIG. 2 to change to "delete now" (in accordance with FIG. 3). Replica state monitoring/update block 40 could then inform replica state processing block 44 of the state change. Replica state processing block 44 can then perform the relevant processing.

As indicated in FIG. 3, delete pending state 62 may also be exited and delete now state 64 entered when the changes are verified. This is indicated in FIG. 3 by changes verified event 58. Returning now to FIG. 4, if the changes in the local copy of the data set reside elsewhere in the enterprise, decision block 74 indicates that the next step would be to initiate a transition to the delete now state. This is illustrated in FIG. 4 by step 78. When this step is reached, replica state processing block 44 of FIG. 2 could direct replica state monitoring/update block 40 to change the replica state in replica list 34 to "delete now." Replica state processing block 44 could then transition to the delete now state.

Embodiments within the scope of this invention can, therefore, comprise means for initiating transition from one intermediate state to another intermediate state. Such means may comprise, for example, changes verified event 58 or remove replica event 56 of FIG. 3. Such means may also comprise, for example, the structures of FIG. 2 which initiate a state transition by modifying the replica state in replica list 34 such as local processing block 38 and replica state monitoring/update block 40.

Figure 5:
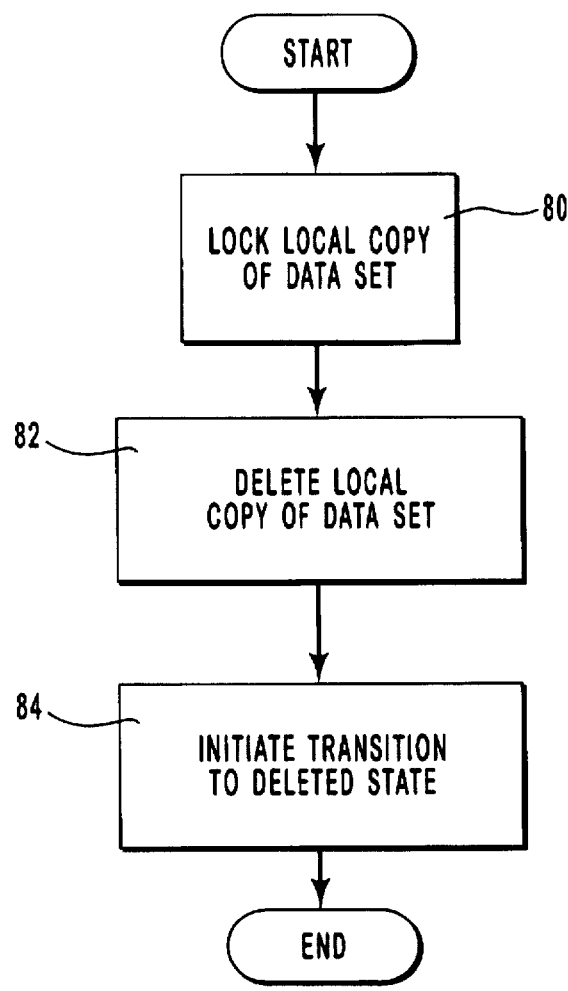
FIG. 5 is a flow diagram illustrating the processing which takes place in the delete now state of one preferred embodiment.

FIG. 5 presents the processing which occurs in one preferred embodiment when the delete now state is entered. This state removes the local copy of the data set. As illustrated in FIG. 5, the first step is to lock the local copy of the data set to prevent all access to the data set. Embodiments in the present invention can, therefore, comprise means for preventing all access to a data set. By way of example, and not limitation, this is indicated in FIG. 5 by step 80. This step is different from step 68 of FIG. 4 which terminates user access to the local copy of the data set. Step 80 of FIG. 5 locks all access to the local copy of the data set just prior to removal. Such a step is necessary because under certain circumstances it may be useful to allow other processes to access the local copy of the data set even though user access to the local copy of the data set has already been terminated. One example of such a situation has previously been described. If changes made to a data set are replicated to nodes in the delete pending state, access by the process which updates the local copy of the data set will be allowed even through user access has been terminated. Such access by other processes is terminated by step 80.

After all access to the local copy of the data set has been terminated, the next step is to physically delete the local copy of the data set. Embodiments of the present invention can, therefore, comprise means to delete the local copy of the data set. This is illustrated, for example, in FIG. 5 by step 82. Such a delete process can be any of the variations utilized by computer systems when they remove computer files from local storage media such as a local hard disk.

After the local copy of the data set has been deleted, the next step is to initiate the transition to the deleted state. This is illustrated in FIG. 5 by step 84. FIG. 3 illustrates that data deleted event 60 causes the transition from deleted now state 64 to deleted state 66. Data deleted event 60 represents the fact that step 82 of FIG. 5 has been accomplished and the transition from delete now state 64 to deleted state 66 should be accomplished as indicated in FIG. 5 by step 84.

An examination of FIG. 3 reveals that the only way to transition from delete now state 64 to deleted state 66 is via data deleted event 60. Furthermore, note that the only transition out of delete now state 64 leads to deleted state 66. This means that if any other events occur such as remove replica event 56 or add replica event 54, they will have no effect on a replica node in delete now state 64. This is consistent with the basic purpose of delete now state 64 which is to ensure that once the computer files which make up the date set begin to be deleted that nothing interrupts the process until all computer files have been deleted. One scenario which should be prevented is the partial removal of a data set. Such a scenario can leave a data set in an unstable and unrecoverable state. For this reason, it is desirable to carry out the removal of information associated with a local copy of a data set without interruption.

As with previous state transitions, replica state processing block 44 of FIG. 2 can inform replica state monitoring/update block 40 to modify the replica state of replica list 34 from delete now to deleted. It is apparent from FIG. 5 that the delete now state is relatively short lived and transitory. This means that once the replica state of replica list 34 in FIG. 2 is modified, the likelihood of that state being replicated to other replica nodes via replication processing block 26 is small. However, if such a state is replicated to other replica nodes in the enterprise, then no unforeseen effects need be created. If other replica nodes in the enterprise treat the delete now state just as they would treat either the delete pending state or the deleted state, then operation of the replication environment should be predictable and consistent with whichever state is selected.

Figure 6:
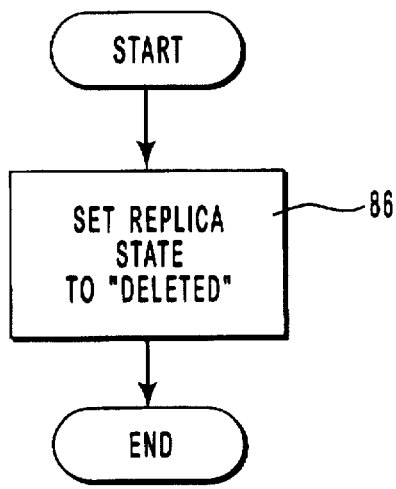
FIG. 6 is a flow diagram illustrating the processing which takes place in the deleted state of one preferred embodiment.

When deleted state 66 of FIG. 3 is entered, very little processing need be performed. The processing of deleted state 66 is illustrated in FIG. 6. As illustrated therein, only a single processing step is performed. As illustrated in step 86, when deleted state 66 of FIG. 3 is entered, the entry in the replica list is set to the deleted state. As previously described in conjunction with other replica state changes, replica state processing block 44 of FIG. 2 can direct replica state monitoring/update block 40 to modify the replica state in replica list 34 to deleted. This deleted state will then be replicated via replication processing block 26 to other replica nodes in the enterprise.

b. Add Replica Process

Figure 7:
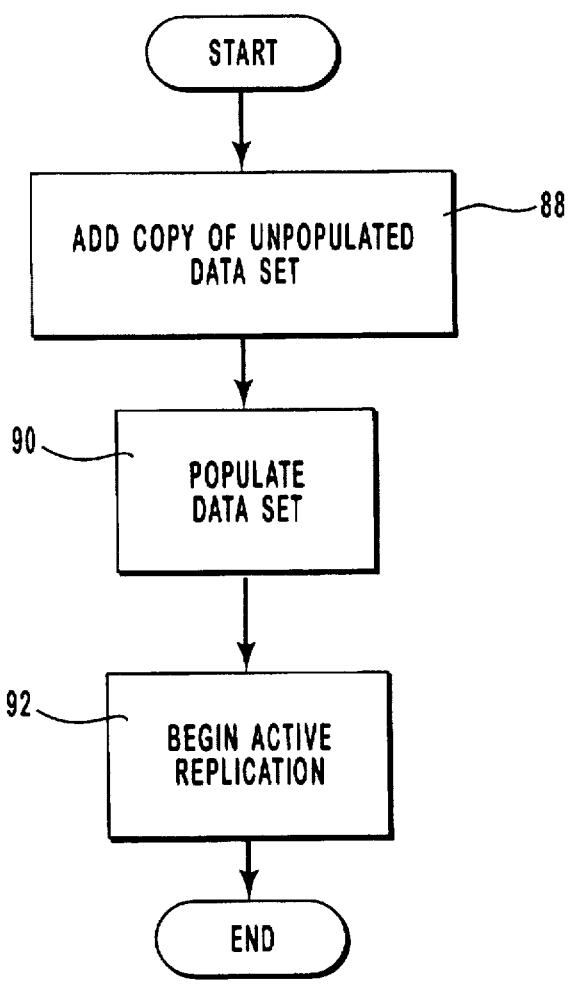
FIG. 7 is a flow diagram illustrating the processing that occurs when the active state of one preferred embodiment is entered.

Returning now to FIG. 3, active state 52 can be entered either from deleted state 66 or delete pending state 62 upon add replica event 54. The processing which occurs when active state 52 is entered is illustrated in FIG. 7.

The first step toward active participation in the replication for a data object is to obtain an unpopulated data set. This is indicated in FIG. 7 by step 88. Obtaining a copy of an unpopulated data set is nothing more than obtaining the data set properties for a particular data set. As previously described, a data set can be thought of as a container which holds one or more data objects. The container or unpopulated data set is described and defined by the data set properties. How a replica node obtains a copy of an unpopulated data set will be dependent upon the implementation of the replication process. For example, in one preferred embodiment of the store and forward replication process described in the copending Store and Forward Application, previously incorporated by reference, the data set properties for all data sets are replicated to each replica node in the enterprise. In such an environment, if a replica node has been added to the replication enterprise, it already has a copy of all data set properties. A method of adding a replica node to a replication enterprise is described in the copending Backfill Application, previously incorporated by reference. A procedure such as the one disclosed in the Backfill Application may be utilized to obtain a copy of the unpopulated data set if necessary. Basically, any procedure which allows the data set properties to be obtained will suffice for step 88.

After the unpopulated data set has been obtained, the next step is to populate the data set with copies of the data set objects. This step is illustrated in FIG. 7 by step 90. The goal of this step is to obtain current copies of the data objects which contain all changes made to the data objects. This can be accomplished by requesting current copies from one or more replica nodes in the enterprise. If step 90 is thought of as obtaining data which is missing from the current copy of the data set, then any procedure which is used to recover missing data may be used to populate the data set. The copending Backfill Application describes a process whereby missing data is requested via data request packets from one or more other replica nodes having the desired data. Such a procedure is entirely adequate for populating the data set. Any other procedure which is compatible with the implemented replication process may also be utilized.

Once the data set properties and the data objects associated with those data set properties have been obtained, a replica node is in a position to begin active replication of the data set. This is illustrated in FIG. 5 by step 92. Note, however, that as soon as a replica node learns that it is to now carry a copy of the data set, users may start connecting to this replica, even though it is not populated. Users may also begin adding data to the local copy of the data set.

As previously discussed, add replica events are typically initiated by an administrator. An administrator directs that a copy of a data set be located on a particular replica node. Local processing block 38 of FIG. 2 can then respond to the add replica event by modifying the replica state in replica list 34 to active. If the local replica node is being moved to the active state, then replica state monitoring/update block 40 will note the state change in replica list 34 and inform replica state processing block 44 which can then take appropriate action. On the other hand, if the replica state change pertains to another replica node, when replica list 34 is replicated via replication processing block 26, the other replica node will receive the state change and take similar actions.

C. Move Replica Process

When a copy of the data set is to be moved from one replica node to another, the replica administrator can initiate a move process. Moving a copy of a data set from one replica node to another consists of two operations. The first operation is an add operation on the target replica node (the replica node which will receive the copy of the data set). The next operation is a remove operation on the source replica node (the replica node which will no longer have a copy of the data set). The add process and remove process previously described can be utilized unchanged for the move operation. Furthermore, since the remove operation checks to ensure that the contents of the data set which is to be removed resides on at least one other replica node in the enterprise, the add operation and remove operation can be issued simultaneously.

4. Summary

The present invention discloses a system and method of replica administration which provides a robust environment for replica administration. Safeguards are incorporated to prevent inadvertent data loss when copies of a data set are removed from a replica node or moved from one replica node to another replica node. Safeguards are also included which prevent only partial removal of a copy of a data set. Such safeguards prevent the system from being left in an unstable and unrecoverable state. In order to prevent inadvertent data loss, the system verifies that all data in the local copy of the data set is held on at least one other replica node in the enterprise before actual removal of the local copy of the data set. The system is prevented from partial removal of a copy of the data set by defining a delete now state which locks all access to the local copy of the data set until the local copy of the data set has been removed. This has the effect of requiring full completion of the physical removal process once it has begun. Finally, a mechanism is put in place to allow an administrator to bypass the safeguards of the present invention and remove a local copy of a data set without performing the checks and safeguards to prevent inadvertent data loss. This mechanism allows the administrator to handle special cases such as the removal of the only copy of the data set.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network where copies of data objects are replicated among a plurality of replica nodes that are logically connected to provide a data flow path from each replica node to any other replica node in the network, and each replica node being capable of making changes to the replicated data objects and each being capable of storing the changes made either locally or by any other node, and each being capable of providing access to such stored changes by any other replica node in the network, a method of removing a local copy of a data object from a local replica node in the computer network while protecting against inadvertent loss of any changes made to the local data object prior to its removal at the local replica node, the method comprising the steps of:

saving, at a local replica node, changes made to a local copy of a data object by the local replica node and changes made by and received from other replica nodes on a computer network so that the local copy of the data object reflects all such changes made to the data object;

transmitting to at least one other replica node in the network any changes which have been made to the local copy of the data object by the local replica node and which have not previously been transmitted to at least one other replica node in the network in order to preserve said changes and ensure continued availability of said changes by virtue of their storage in said at least one other replica node of the network;

verifying that the saved changes reside on at least one other replica node in the network prior to removal of the local copy of the data object from the local replica node by (1) sending a message to said at least one other replica node, and by (2) positively confirming that the saved changes reside on the at least one other replica node if the combination of all changes on all replica nodes other than the local replica node include at least the saved changes;

removing the local copy of the data object from the local replica node if said saved changes reside on at least one other replica node without removing any changes from said at least once other replica node; and accessing said saved changes from at least one replica node in the network.

2. A method of removing a copy of a data object from a replica node as recited in claim 1 further comprising the step of terminating user access to the local copy of the data object prior to the step of transmitting any changes which have been made to the local copy of the data object that have not previously been transmitted.

3. A method of removing a copy of a data object from a replica node as recited in claim 1 further comprising the step of removing the local replica node from a replica list comprising all replica nodes that have a copy of the data object.

4. A method of removing a copy of a data object from a replica node as recited in claim 1 wherein the message sent to said at least one other replica node comprises a request to respond if the saved changes reside on said at least one other replica node.

5. A method of removing a copy of a data object from a replica node as recited in claim 1 wherein the step of verifying that the saved changes reside on at least one other replica node in the network is skipped if an administrator directs that the step be skipped.

6. A method of removing a copy of a data object from a replica node as recited in claim 1 further comprising the step of preventing all access to the local copy of the data object prior to the step of removing the local copy of the data object.

7. In a computer network where copies of data objects are replicated among a plurality of replica nodes that are logically connected to provide a data flow path from each replica node to any other replica node in the network, and each replica node being capable of making changes to the replicated data objects and each being capable of storing the changes made either locally or by any other node, and each being capable of providing access to such stored changes by any other replica node in the network, a method of removing a local copy of a data object from a local replica node in the computer network while protecting against inadvertent loss of any changes made to the local data object prior to its removal at the local replica node, the method comprising the steps of:

transmitting to at least one other replica node in a network any changes which have been made to a local copy of a data object by a local replica node and which have not previously been transmitted to at least one other replica node in the network;

verifying that all changes which form the basis for the local copy of the data object reside on at least one other replica node on the network so that said changes will be preserved and will remain available to said network by (1) transmitting a message comprising a request for a replica node that receives the message to respond if the replica node that receives the message has at least the changes held by the local replica node, and by (2) positively confirming that the changes forming the basis for the local copy of the data object reside on at least one other replica node if the combination of all changes on all replica nodes, other than the local replica node, include at least the changes which form the basis for the local copy of the data object; and if said changes reside on said at least one other replica node, then removing the local copy of the data object from the local replica node without removing any changes from said at least one other replica node.

8. A method of removing a copy of a data object from a replica node as recited in claim 7 further comprising the step of terminating access to the local copy of the data object prior to the step of transmitting any changes made to the local copy of the data object and which have not previously been transmitted.

9. A method of removing a copy of a data object from a replica node as recited in claim 8 wherein the local copy of the data object can be removed through intervention by an administrator even if all changes which form the basis for the local copy of the data object do not reside on at least one other replica node.

10. A method of removing a copy of a data object from a replica node as recited in claim 9 further comprising the step of removing the local replica node from a replica list comprising all replica nodes that have a copy of the data object.

11. A method of removing a copy of a data object from a replica node as recited in claim 9 further comprising the step of informing other replica nodes that the local copy of the data object has been deleted.

12. In a computer network where copies of data objects are replicated among a plurality of replica nodes that are logically connected to provide a data flow path from each replica node to any other replica node in the network, and each replica node being capable of making changes to the replicated data objects and each being capable of storing the changes made either locally or by any other node, and each being capable of providing access to such stored changes by any other replica node in the network, a method of moving a copy of a data object from a local replica node in the computer network while protecting against inadvertent loss of any changes made to the local data object prior to its removal at the local replica node, the method comprising the steps of:

initiating a process to add a first copy of a data object to a first replica node where a copy of said data object does not currently reside;

initiating a process to remove a second copy of said data object from a second replica node, said process to remove the second copy of the data object comprising:

transmitting to at least one other replica node in a network any changes which have been made to a local copy of a data object by a local replica node and which have not previously been transmitted to at least one other replica node in the network;

verifying that all changes which form the basis for the local copy of the data object reside on at least one other replica node on the network so that said changes will be preserved and will remain available to said network by (1) sending a message to said at least one other replica node, and by (2) positively confirming that the saved changes reside on the at least one other replica node if the combination of all changes on all replica nodes other than the local replica node include at least the saved changes; and if said changes reside on said at least one other replica node, then removing the local copy of the data object from the local replica node without removing any changes from said at least one other replica node.

13. An article of manufacture for use in a computer system defining a location in a computer network where a copy of a designated data object is replicated, said computer system logically connected to at least one other computer system through networking means, each computer system comprising a CPU, said article of manufacture comprising:

program storage means for storing and providing to the CPU program code means, said program code means comprising:

means for defining an active state of a local computer system where changes made to a local copy of a data object by the local computer system are transmitted to at least one other computer system and where changes made to a copy of said data object stored by said at least one other computer system are transmitted to said local system;

means for defining a deleted state of said local computer system where said local copy of the data object has been removed from said local computer system so that said local copy no longer exists on said local computer system;

and means for defining at least one intermediate state between said active and deleted states of said local computer system where (a) said local computer system transmits to said at least one other computer system any changes made to the local copy of the data object by said local system which have not yet been transmitted to said at least one other computer system, and where (b) said local system verifies that all information contained in the local copy of the data object resides on at least one other computer system so that when the local copy of the data object is removed, changes made to the local copy of the data object will be preserved on said at least one other computer system by (1) sending a message to said at least one other replica node, and by (2) positively confirming that the saved changes reside on the at least one other replica node if the combination of all changes on all replica nodes other than the local replica node include at least the saved changes.

14. An article of manufacture as recited in claim 13 wherein the program code means further comprises means for initiating transition from one state to another.

15. An article of manufacture as recited in claim 14 wherein the means for initiating transition from one state to another comprises means for initiating transition from the active state to said at least one intermediate state under direction from a network administrator.

16. An article of manufacture as recited in claim 13 wherein the program code means comprises means for initiating transition from the active state to said at least one intermediate state and means for initiating transition from said at least one intermediate state either to said active state or to said deleted state.

17. An article of manufacture as recited in claim 13 wherein said means for defining at least one intermediate state comprises means for defining a first intermediate state where said local computer system transmits to said at least one other computer system any changes made to the local copy of the data object by said local system which have not yet been transmitted to said at least one other computer system and where said local system verifies that all information contained in the local copy of the data object resides on at least one other computer system and means for defining a second intermediate state where the local copy of the data object is removed from said local computer system.

18. An article of manufacture as recited in claim 17 wherein said program code means comprises:

means to initiate transition from said active state to said first intermediate state;

means to initiate transition from said first intermediate state to said second intermediate state;

means to initiate transition from said first intermediate state to said active state;

means to initiate transition from said second intermediate state to said deleted state; and means to initiate transition from said deleted state to said active state.

19. An article of manufacture as recited in claim 18 wherein said means to initiate transition from said active state to said first intermediate state initiates the transition in response to a command from a network administrator.

20. An article of manufacture as recited in claim 18 wherein said means to initiate transition from said first intermediate state to said active state initiates the transition in response to a command from a network administrator.

21. An article of manufacture as recited in claim 18 wherein said means to initiate transition from said first intermediate state to said second intermediate state initiates the transition in response to either a command from a network administrator or a positive determination that all information contained in the local copy of the data object resides on at least one other computer system in the network.

22. An article of manufacture as recited in claim 18 wherein said means to initiate transition from said second intermediate state to said deleted state initiates the transition after the local copy of the data object has been removed from said local system.

23. An article of manufacture as recited in claim 18 wherein said means to initiate transition from said deleted state to said active state initiates the transition in response to a command from a network administrator.

24. An article of manufacture for use in a computer system defining a location in a computer network where a copy of a designated data object is replicated, said computer system logically connected to at least one other computer system through networking means, each computer system comprising a CPU, said article of manufacture comprising:

program storage means for storing and providing to the CPU program code means, said program code means comprising;

means for initiating replication of changes which have been made but which have not yet been previously replicated to at least one other computer system in a computer network;

means for verifying that the changes which have been made to said local copy of the data object reside of at least one other computer system in the computer network before said local copy of the data object is removed from said local computer system so that when the local copy of the data object is removed, changes made to the local copy of the data object will be preserved on said at least one other computer system by (1) sending a message to said at least one other replica node, and by (2) positively confirming that the saved changes reside on the at least one other replica node if the combination of all changes on all replica nodes other than the local replica node include at least the saved changes; and means for tracking a replica state of the local computer system with respect to said local copy of the data object, said replica state reflecting whether the local computer system is actively participating in the replication of said data object or whether the local computer system is in the process of removing the local copy of the data object from said local computer system.

25. An article of manufacture as recited in claim 24 wherein the program code means further comprise means for changing the replica state of the local computer system.

26. An article of manufacture as recited in claim 24 wherein the program code means further comprise means for bypassing the means for verifying that the changes which have been made to said local copy of the data object reside on at least one other computer system in the computer network so that said local copy of the data object can be deleted without verifying that the changes reside on at least one other computer system.

27. An article of manufacture as recited in claim 24 wherein the program code means comprises means for notifying a network administrator if attempts to verify that the changes made to the local copy of the data object reside on at least one other computer system are unsuccessful.

* * * * *

UNITED STATES PATENT AND TRADEMARK OFFICE
CERTIFICATE OF CORRECTION

PATENT NO. : 5,787,247
DATED : Jul. 28, 1998
INVENTOR(S) : Norin et al

Page 1 of 2

It is certified that error appears in the above-identified patent and that said Letters Patent is hereby corrected as shown below:

On the title page: Item [56] Reference Cited:

Other Publications, first line, after "Yavin," change "d." to --D.--

Col. 1, line 22, before "and" delete "is"

Col. 1, line 23, before "resources" change "information" to --informational--

Col. 3, line 29, after "can be" change "though" to --thought--

Col. 14, line 17, after "was" change "list" to --last--

Col. 14, line 66, after "for example" change "tby" to --by--

Col. 17, line 5, before "participating" change "filly" to --fully--

Col. 20, line 44, after "particular" change "Copy" to --copy--

UNITED STATES PATENT AND TRADEMARK OFFICE
CERTIFICATE OF CORRECTION

PATENT NO. : 5,787,247
DATED : Jul. 28, 1998
INVENTOR(S) : Norin et al

It is certified that error appears in the above-identified patent and that said Letters Patent is hereby corrected as shown below:

Col. 23, line 66, before "reside" change "vocally" to --locally--

Col. 25, line 64, after "other" change "hands" to --hand,--

Col. 29, line 30, before "Move" change "C." to --c.--

Col. 30, line 54, after "least" change "once" to --one--

Col. 34, line 22, after "comprising" change the semicolon to a colon.

Col. 34, line 29, after "reside" change "of" to --on--

Signed and Sealed this

Seventh Day of December, 1999

Q. TODD DICKINSON

Attest:

*Attesting Officer*    *Acting Commissioner of Patents and Trademarks*